US012791667B2

(12) United States Patent
Watanabe et al.

(10) Patent No.: US 12,791,667 B2
(45) Date of Patent: Nov. 10, 2026

(54) RANGING SYSTEM, DRIVE METHOD, AND ELECTRONIC DEVICE

(71) Applicant: SONY SEMICONDUCTOR SOLUTIONS CORPORATION, Kanagawa (JP)

(72) Inventors: Masahiro Watanabe, Kanagawa (JP); Akihiro Koyama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1046 days.

(21) Appl. No.: 17/755,079

(22) PCT Filed: Oct. 14, 2020

(86) PCT No.: PCT/JP2020/038709
§ 371 (c)(1),
(2) Date: Apr. 20, 2022

(87) PCT Pub. No.: WO2021/085125
PCT Pub. Date: May 6, 2021

(65) Prior Publication Data

US 2022/0291340 A1 Sep. 15, 2022

(30) Foreign Application Priority Data

Oct. 28, 2019 (JP) ................................ 2019-195195

(51) Int. Cl.
*G01S 7/48* (2006.01)
*G01S 7/4865* (2020.01)
(Continued)

(52) U.S. Cl.
CPC .......... *G01S 7/4802* (2013.01); *G01S 7/4865* (2013.01); *G01S 17/10* (2013.01); *H05B 47/115* (2020.01); *G01S 17/894* (2020.01); *G01S 17/931* (2020.01)

(58) Field of Classification Search
None
See application file for complete search history.

(56) References Cited

U.S. PATENT DOCUMENTS 10,302,746 B2 5/2019 O'Keeffe
2001/0014215 A1 8/2001 Ide et al.
(Continued)

FOREIGN PATENT DOCUMENTS

EP 3267227 A1 1/2018
JP 10-062550 A 3/1998
(Continued)

OTHER PUBLICATIONS

International Search Report and Written Opinion of PCT Application No. PCT/JP2020/038709, issued on Dec. 1, 2020, 12 pages of ISRWO.

*Primary Examiner* — Hovhannes Baghdasaryan
(74) *Attorney, Agent, or Firm* — CHIP LAW GROUP

(57) ABSTRACT

The present technology relates to a ranging system, a drive method, and an electronic device that are capable of measuring distances to multiple objects at different distances in a single screen.

Provided are a ranging system, a drive method, and an electronic device that are capable of measuring distances to multiple objects at different distances in a single screen. The ranging system includes a lighting device for irradiating, of multiple divided areas obtained by dividing an entire area where irradiation is allowed, two or more divided areas that correspond to some portions of the entire area with irradiation light, and a ranging sensor for receiving reflected light
(Continued)

that is the irradiation light reflected from an object. The ranging sensor drives only some portions of an entire light-receiving area that correspond to the two or more divided areas, to receive the reflected light. The present technology is applicable to, for example, ranging modules for measuring distances to objects.

17 Claims, 19 Drawing Sheets

(51) Int. Cl.

| | |
|---|---|
| ***G01S 17/10*** | (2020.01) |
| ***H05B 47/115*** | (2020.01) |
| *G01S 17/894* | (2020.01) |
| *G01S 17/931* | (2020.01) |

(56) References Cited

U.S. PATENT DOCUMENTS

| | | | | |
|---|---|---|---|---|
| 2003/0090647 | A1 | 5/2003 | Isogai et al. | |
| 2011/0202310 | A1* | 8/2011 | Min | G01S 17/10 356/625 |
| 2015/0241564 | A1 | 8/2015 | Takano | |
| 2015/0285623 | A1 | 10/2015 | Tachibana | |
| 2015/0378023 | A1* | 12/2015 | Royo Royo | G01S 17/89 356/5.01 |
| 2017/0003392 | A1* | 1/2017 | Bartlett | G01S 17/42 |
| 2017/0242105 | A1 | 8/2017 | Dussan | |
| 2018/0003821 | A1 | 1/2018 | Imai | |
| 2018/0143007 | A1* | 5/2018 | Wu | H04N 13/204 |
| 2018/0316909 | A1 | 11/2018 | Tsubaki | |
| 2019/0079172 | A1 | 3/2019 | Field | |
| 2019/0146071 | A1 | 5/2019 | Donovan | |
| 2019/0383946 | A1* | 12/2019 | Namba | G06V 20/58 |
| 2020/0072946 | A1* | 3/2020 | Fisher | G01S 7/4863 |
| 2021/0088631 | A1* | 3/2021 | Otsuka | G01S 7/484 |
| 2021/0109197 | A1* | 4/2021 | O'Keeffe | G01S 7/4816 |

FOREIGN PATENT DOCUMENTS

| | | | |
|---|---|---|---|
| JP | 2001-221633 | A | 8/2001 |
| JP | 2003-149338 | A | 5/2003 |
| JP | 2018-004426 | A | 1/2018 |
| JP | 2018-119942 | A | 8/2018 |
| JP | 2018-189443 | A | 11/2018 |
| WO | 2014/097539 | A1 | 6/2014 |

* cited by examiner

RANGING SYSTEM, DRIVE METHOD, AND ELECTRONIC DEVICE

CROSS REFERENCE TO RELATED APPLICATIONS

This application is a U.S. National Phase of International Patent Application No. PCT/JP2020/038709 filed on Oct. 14, 2020, which claims priority benefit of Japanese Patent Application No. JP 2019-195195 filed in the Japan Patent Office on Oct. 28, 2019. Each of the above-referenced applications is hereby incorporated herein by reference in its entirety.

TECHNICAL FIELD

The present technology relates to a ranging system, a drive method, and an electronic device, and in particular, to a ranging system, a drive method, and an electronic device that are capable of measuring distances to multiple objects at different distances in a single screen.

BACKGROUND ART

In recent years, by virtue of advances in semiconductor technology, ranging modules for measuring distances to objects have been reduced in size. With this, for example, mobile devices such as smartphones having ranging modules mounted thereon have been fabricated.

As a ranging method for such ranging modules, for example, the Indirect ToF (Time of Flight) system is available. The Indirect ToF system is a system that irradiates an object with light and that detects the light reflected from a surface of the object to measure the time of flight of the light, to thereby calculate the distance to the object on the basis of the measurement value. As a distance to an object is increased, the light emission intensity of irradiation light with which the object is irradiated needs to be increased. PTL 1 discloses a technology for performing control to change the light amount of a laser light source depending on a distance to be detected.

CITATION LIST

Patent Literature

[PTL 1]
Japanese Patent Laid-open No. 2018-4426

SUMMARY

Technical Problem

However, in a case where multiple objects are present at different distances in a single screen, since the reflected light amount is different between an object at a long distance and an object at a short distance, it is difficult to acquire the distances to both the objects at the same time.

The present technology has been made in view of such a circumstance and makes it possible to measure distances to multiple objects at different distances in a single screen.

Solution to Problem

According to a first aspect of the present technology, there is provided a ranging system including a lighting device for irradiating, of multiple divided areas obtained by dividing an entire area where irradiation is allowed, two or more divided areas that correspond to some portions of the entire area with irradiation light, and a ranging sensor for receiving reflected light that is the irradiation light reflected from an object. The ranging sensor drives only some portions of an entire light-receiving area that correspond to the two or more divided areas, to receive the reflected light.

According to a second aspect of the present technology, there is provided a drive method for a ranging system including a lighting device and a ranging sensor. The drive method includes irradiating, by the lighting device, of multiple divided areas obtained by dividing an entire area where irradiation is allowed, two or more divided areas that correspond to some portions of the entire area with irradiation light, and driving, by the ranging sensor, only some portions of an entire light-receiving area that correspond to the two or more divided areas, to receive reflected light that is the irradiation light reflected from an object.

According to a third aspect of the present technology, there is provided an electronic device including a ranging system. The ranging system includes a lighting device for irradiating, of multiple divided areas obtained by dividing an entire area where irradiation is allowed, two or more divided areas that correspond to some portions of the entire area with irradiation light, and a ranging sensor for receiving reflected light that is the irradiation light reflected from an object. The ranging sensor drives only some portions of an entire light-receiving area that correspond to the two or more divided areas, to receive the reflected light.

In the first to third aspects of the present technology, the lighting device irradiates, of the multiple divided areas obtained by dividing the entire area where irradiation is allowed, the two or more divided areas that correspond to the some portions of the entire area with irradiation light, and the ranging sensor drives only the some portions of the entire light-receiving area that correspond to the two or more divided areas, to receive the reflected light that is the irradiation light reflected from the object.

The ranging system and the electronic device may be individual devices or may be modules that are incorporated in another device.

DESCRIPTION OF EMBODIMENT

Now, a mode for carrying out the present technology (hereinafter referred to as an "embodiment") is described with reference to the attached drawings. Note that, in the present specification and the drawings, components having substantially the same functional configurations are denoted by the same reference signs to omit the overlapped description. The following items are described in order.

1. Configuration Example of Ranging System
2. Principle of Indirect ToF Ranging
3. Detailed Configuration Example of Ranging Sensor
4. Configuration Example of Lighting Device
5. Processing Flow of Distance Measurement Processing
6. Configuration Example of Electronic Device
7. Application Example to Mobile Body <1. Configuration Example of Ranging System>

Figure 1:
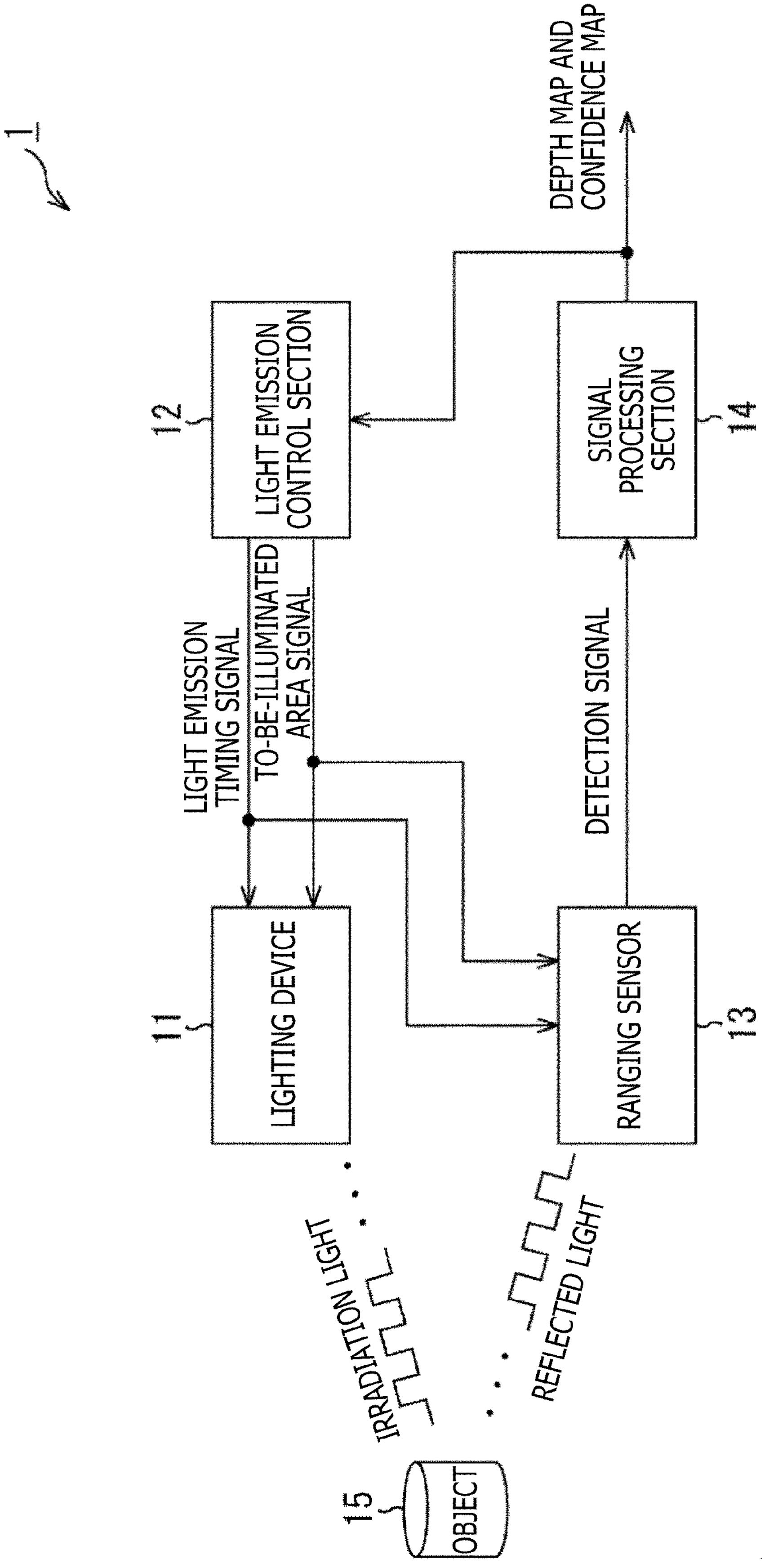
FIG. 1 is a block diagram depicting a configuration example of a ranging system to which the present technology is applied.

FIG. 1 is a block diagram depicting a configuration example of a ranging system to which the present technology is applied.

A ranging system 1 in FIG. 1 includes a lighting device 11, a light emission control section 12, a ranging sensor 13, and a signal processing section 14 and performs Indirect ToF ranging.

That is, the ranging system 1 irradiates a predetermined object 15 that is an object to be measured, with light (irradiation light), and receives the light reflected from the object 15 (reflected light). On the basis of the light reception result, the ranging system 1 then outputs, as measurement results, a confidence map and a depth map that represents information regarding the distance to the object 15.

The lighting device 11 includes, for example, multiple light-emitting elements such as VCSELs (Vertical Cavity Surface Emitting Lasers) arranged in the planar direction.

The lighting device 11 modulates and emits light at a timing based on a light emission timing signal supplied from the light emission control section 12, to irradiate the object 15 with the irradiation light. The irradiation light is infrared light having a wavelength in a range of approximately 850 to 940 nm, for example.

Figure 2A:
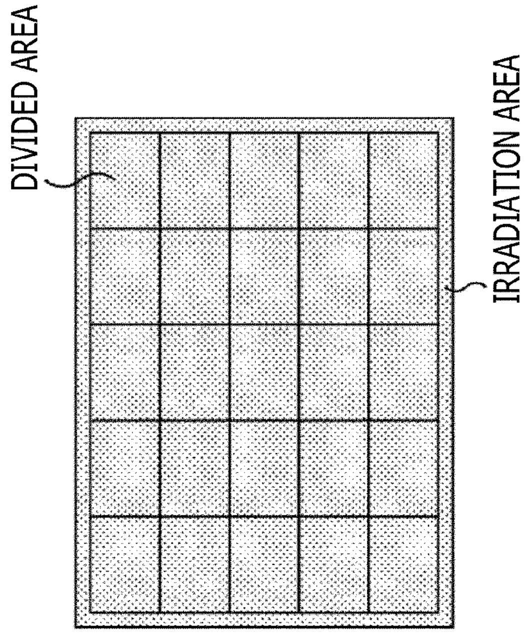
FIGS. 2A and 2B depict diagrams for explaining the control of an irradiation area.
Figure 2B:
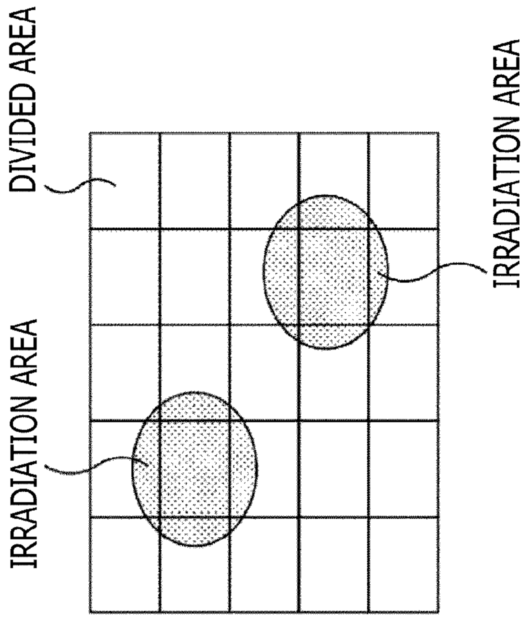

The lighting device 11 can turn on and off its irradiation on a divided-area basis. The divided area is obtained by dividing the entire irradiatable area where irradiation can be performed, into multiple divided areas. For example, the lighting device 11 can perform entire irradiation to irradiate the entire irradiatable area at a uniform light emission intensity in a predetermined luminance range, as depicted in FIG. 2A. The lighting device 11 can also perform partial irradiation to irradiate only one or more divided areas with light, as depicted in FIG. 2B. FIG. 2B depicts an example in which, of the entire area divided into 5×5=25 divided areas, two divided areas separated from each other are irradiated. In FIGS. 2A and 2B, the region indicated by the dot pattern represents an irradiation area. Which divided area is to be irradiated by the lighting device 11 is controlled with a to-be-illuminated area signal supplied from the light emission control section 12.

The light emission control section 12 supplies a light emission timing signal having a predetermined modulation frequency (for example, 20 or 100 MHz), to the lighting device 11, to control the light emission timing of the lighting device 11. Further, the light emission control section 12 supplies the light emission timing signal also to the ranging sensor 13 to drive the ranging sensor 13 in synchronization with the light emission timing of the lighting device 11.

Moreover, the light emission control section 12 supplies, to the lighting device 11, a to-be-illuminated area signal for controlling the irradiation area of the lighting device 11. Further, the light emission control section 12 supplies the to-be-illuminated area signal also to the ranging sensor 13 to drive only an area corresponding to the irradiation area of the lighting device 11. Thus, the to-be-illuminated area signal also functions as a light-receiving area signal for controlling the light-receiving area of the ranging sensor 13, and it can be said that the light emission control section 12 is a control section for controlling the drive of the entire ranging system 1.

The ranging sensor 13 receives reflected light from the object 15 by a pixel array section 63 (FIG. 6) in which multiple pixels are two-dimensionally arranged in a row direction and a column direction, that is, in a matrix. Then, the ranging sensor 13 supplies a detection signal based on the light amount of the received reflected light, to the signal processing section 14 pixel by pixel of the pixel array section 63.

The signal processing section 14 calculates, on the basis of the detection signal supplied from the ranging sensor 13 for each pixel in the pixel array section 63, a depth value that is the distance from the ranging system 1 to the object 15. Then, the signal processing section 14 generates a depth map in which a depth value is stored as a pixel value of each pixel and a confidence map in which a confidence degree is stored as the pixel value of each pixel, and outputs the depth map and the confidence map to the outside. Calculation methods for a depth value and a confidence degree are described later.

Further, the signal processing section 14 supplies the generated depth map and confidence map also to the light emission control section 12. On the basis of the depth map and the confidence map that are supplied from the signal processing section 14, the light emission control section 12 decides an irradiation area, a light emission intensity, and the like, and generates and outputs a to-be-illuminated area signal. The to-be-illuminated area signal includes information regarding the control of light emission, such as irradiation area or light emission intensity information.

The ranging system 1 configured as described above can control whether or not to perform irradiation with irradiation light, on a divided-area basis. The divided area is obtained by dividing the entire irradiatable area into the multiple divided areas. The ranging sensor 13 can drive only an area corresponding to a divided area which is irradiated with irradiation light by the lighting device 11, to perform reception operation.

Figure 3A:
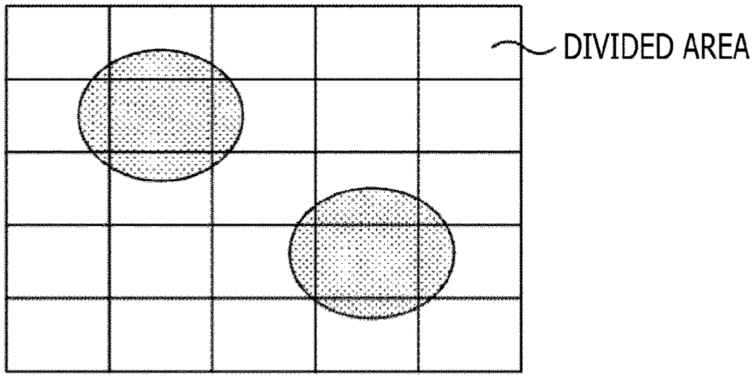
FIGS. 3A, 3B, and 3C depict diagrams for explaining the drive of the ranging system.
Figure 3B:
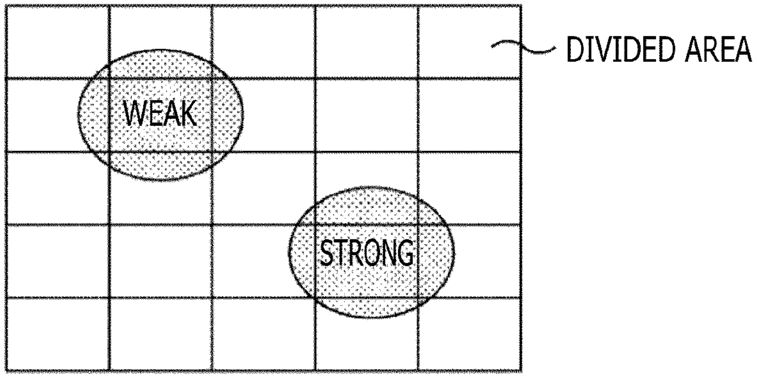

For example, in a case where the lighting device 11 irradiates, as depicted in FIG. 2B, only the two divided areas of the entire irradiation area which is divided into the 5×5=25 divided areas, the two divided areas can be irradiated at the same light emission intensity as depicted in FIG. 3A, or the two divided areas can be irradiated at different light emission intensities as depicted in FIG. 3B. The divided area for which a strong light emission intensity is set corresponds to an object at a long distance from the object 15 that is a measurement subject, and the divided area for which a weak light emission intensity is set corresponds to an object at a short distance from the object 15 that is a measurement subject.

Figure 3C:
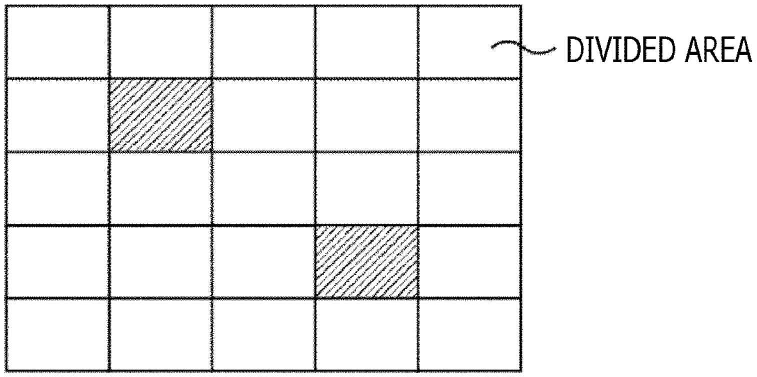

Further, as depicted in FIG. 3C, on the basis of a to-be-illuminated area signal, the ranging sensor 13 drives, as a light-receiving area, only an area corresponding to the irradiation area of the lighting device 11 and supplies the detection signal of each pixel in the light-receiving area to the signal processing section 14.

Note that, in the ranging system 1, one of the light emission control section 12 and the signal processing section 14 can be incorporated in the other as a part thereof, and the light emission control section 12 and the signal processing section 14 can be configured as a single signal processing chip.

Figure 4A:
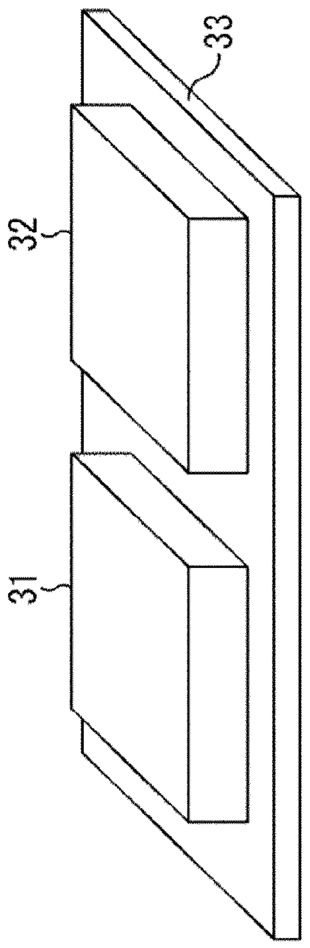
FIGS. 4A and 4B depict diagrams of a chip configuration example of a ranging sensor.

FIG. 4A depicts a chip configuration example in a case where the light emission control section 12 and the signal processing section 14 are configured as a single signal processing chip.

For example, the ranging sensor 13 is formed as a first chip 31 that is a single chip, and the light emission control section 12 and the signal processing section 14 are formed as a second chip 32 that is a single chip. Further, the first chip 31 and the second chip 32 are formed on a relay substrate 33, and signals are transferred between the first chip 31 and the second chip 32 through the relay substrate 33. The relay substrate 33 has one surface on which the first chip 31 and the second chip 32 are mounted, and the opposite surface on which external output terminals such as solder balls are formed.

Figure 4B:
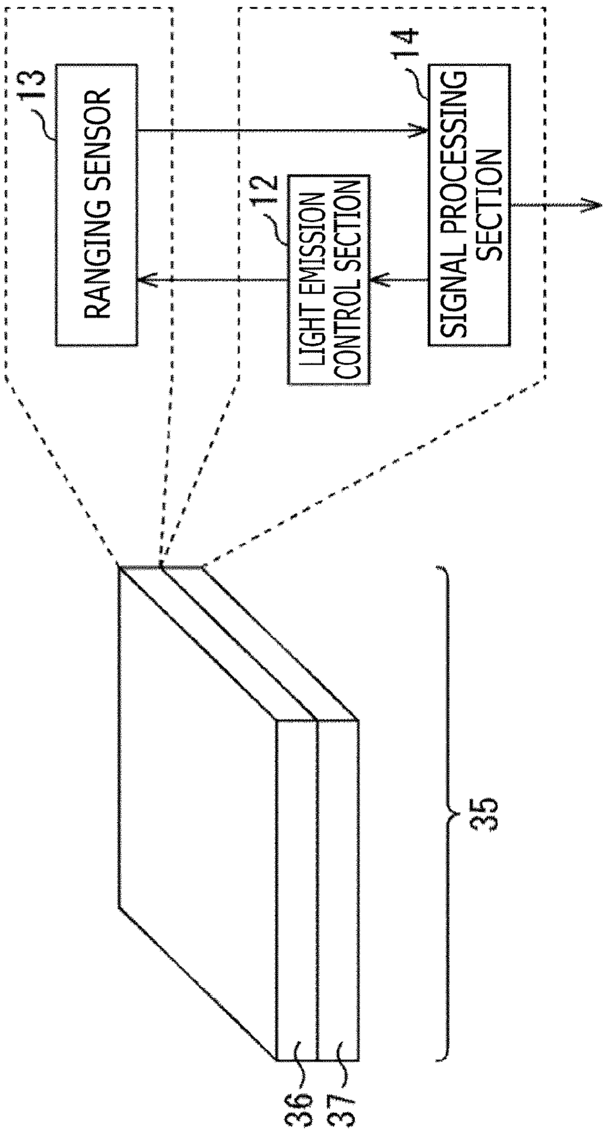

Further, as depicted in FIG. 4B, the ranging sensor 13, the light emission control section 12, and the signal processing section 14 may be configured as a single chip.

A single chip 35 in FIG. 4B includes a first die (substrate) 36 and a second die (substrate) 37 that are stacked. For example, the first die 36 includes the ranging sensor 13, and the second die 37 includes the light emission control section 12 and the signal processing section 14.

Note that the single chip 35 may include three layers including, in addition to the first die 36 and the second die 37, another logic die stacked or include four or more layers of dies (substrates) stacked.

<2. Principle of Indirect ToF Ranging>

Figure 5:
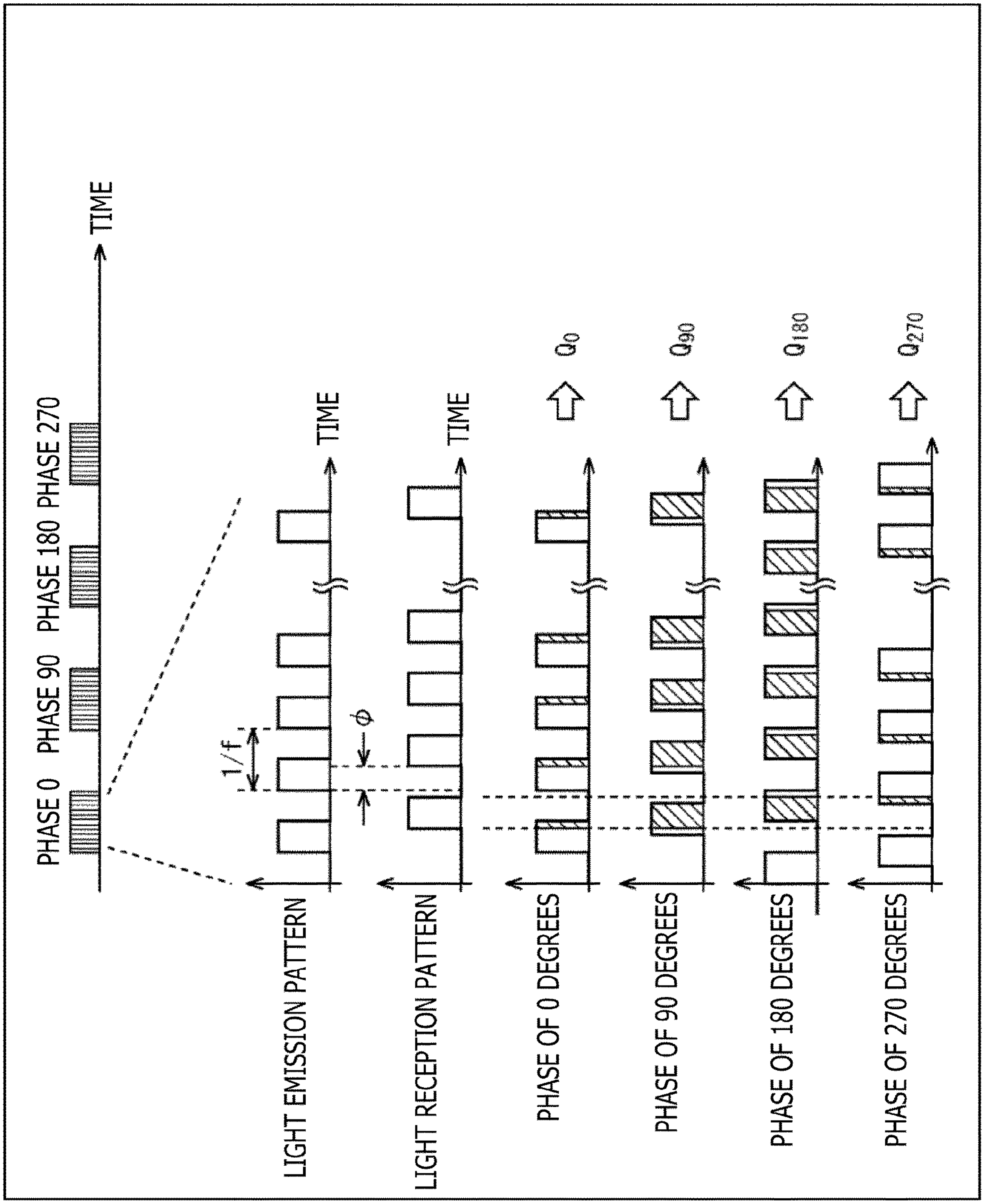
FIG. 5 is a diagram for briefly explaining the principle of Indirect ToF ranging.

Next, with reference to FIG. 5, the principle of Indirect ToF ranging is briefly described.

A depth value d [mm] corresponding to the distance from the ranging system 1 to the object 15 can be calculated by the following expression (1).

[Math. 1]

$$d = \frac{1}{2} \cdot c \cdot \Delta t \tag{1}$$

In the expression (1), Δt denotes time required for irradiation light to enter the ranging sensor 13 after being emitted from the lighting device 11 and then reflected from the object 15, and c denotes the speed of light.

As the irradiation light that is emitted from the lighting device 11, pulse light in a light emission pattern in which light is repetitively turned on and off at high speed at a predetermined modulation frequency f as depicted in FIG. 5 is employed. A single period T in the light emission pattern is 1/f. The ranging sensor 13 detects reflected light (light reception pattern) in a phase shifted depending on the time Δt required for light to travel from the lighting device 11 to the ranging sensor 13. The time Δt can be calculated by the following expression (2) where φ denotes the phase shift amount (phase difference) between the light emission pattern and the light reception pattern.

[Math. 2]

$$\Delta t = \frac{1}{f} \cdot \frac{\phi}{2\pi} \tag{2}$$

Thus, the depth value d from the ranging system 1 to the object 15 can be calculated by the following expression (3) according to the expression (1) and the expression (2).

[Math. 3]

$$d = \frac{c\phi}{4\pi f} \tag{3}$$

Next, a technique of calculating the phase difference φ described above is described.

Each pixel in the pixel array formed in the ranging sensor 13 repetitively performs ON/OFF operations at high speed and accumulates charges only in the ON period.

The ranging sensor 13 sequentially changes the timing of executing the ON/OFF operations in each pixel in the pixel array, accumulates charges at each execution timing, and outputs a detection signal based on the accumulated charges.

The timing of executing the ON/OFF operations includes, for example, four types, namely, a phase of zero degrees, a phase of 90 degrees, a phase of 180 degrees, and a phase of 270 degrees.

The execution timing at the phase of zero degrees is a timing at which the ON timing (light reception timing) of each pixel in the pixel array is in the same phase as the phase of pulse light that the lighting device 11 emits, that is, the phase of the light emission pattern.

The execution timing at the phase of 90 degrees is a timing at which the ON timing (light reception timing) of each pixel in the pixel array is in a phase delayed by 90 degrees from the phase of pulse light that the lighting device 11 emits (light emission pattern).

The execution timing at the phase of 180 degrees is a timing at which the ON timing (light reception timing) of each pixel in the pixel array is in a phase delayed by 180 degrees from the phase of pulse light that the lighting device 11 emits (light emission pattern).

The execution timing at the phase of 270 degrees is a timing at which the ON timing (light reception timing) of each pixel in the pixel array is in a phase delayed by 270 degrees from the phase of pulse light that the lighting device 11 emits (light emission pattern).

The ranging sensor 13 sequentially changes the light reception timing in the order of, for example, the phase of zero degrees, the phase of 90 degrees, the phase of 180 degrees, and the phase of 270 degrees and acquires the received light amount (accumulated charges) of reflected light at each light reception timing. In FIG. 5, at the light reception timing (ON timing) in each phase, timings at which reflected light enters are indicated by the diagonal lines.

When, as depicted in FIG. 5, charges accumulated at the light reception timing changed in the order of the phase of zero degrees, the phase of 90 degrees, the phase of 180 degrees, and the phase of 270 degrees are denoted by $Q_0$, $Q_{90}$, $Q_{180}$, and $Q_{270}$, the phase difference φ can be calculated by the following expression (4) using $Q_0$, $Q_{90}$, $Q_{180}$, and $Q_{270}$.

[Math. 4]

$$\phi = \text{Arctan}\frac{Q_{90} - Q_{270}}{Q_{180} - Q_0} \tag{4}$$

The phase difference φ calculated by the expression (4) can be input to the expression (3) above to calculate the depth value d from the ranging system 1 to the object 15.

Further, a confidence degree conf is a value that indicates the intensity of light received by each pixel, and can be calculated by the following expression (5), for example.

[Math. 5]

$$conf = \sqrt{(Q_{180} - Q_0)^2 + (Q_{90} - Q_{270})^2} \tag{5}$$

Moreover, a reflectance ref of an object to be measured can be calculated by multiplying the square of the depth value d [mm] and the confidence degree conf as in an expression (6).

$$\text{ref}=\text{conf}\times(d/1000)^2 \tag{6}$$

When the ranging sensor 13 includes a single charge accumulation section in each pixel in the pixel array as in the case with a general image sensor, the light reception timing is changed in the order of the phase of zero degrees, the phase of 90 degrees, the phase of 180 degrees, and the phase of 270 degrees by the frame as described above, and detection signals based on accumulated charges (charge $Q_0$, charge $Q_{90}$, charge $Q_{180}$, and charge $Q_{270}$) in the respective phases are sequentially supplied to the signal processing section 14. In this case, detection signals for four frames are needed to acquire detection signals in the four phases, namely, the phase of zero degrees, the phase of 90 degrees, the phase of 180 degrees, and the phase of 270 degrees.

In contrast to this, in a case where the ranging sensor 13 includes two charge accumulation sections in each pixel in the pixel array as described later, charges can be accumulated in the two charge accumulation sections alternately to acquire detection signals at two light reception timings in the opposite phases, such as the phase of zero degrees and the phase of 180 degrees, in a single frame. In this case, detection signals for two frames are only required to acquire detection signals in the four phases, namely, the phase of zero degrees, the phase of 90 degrees, the phase of 180 degrees, and the phase of 270 degrees.

The signal processing section 14 calculates, on the basis of a detection signal supplied from the ranging sensor 13 for each pixel in the pixel array, the depth value d that is the distance from the ranging system 1 to the object 15. Then, the signal processing section 14 generates a depth map in which the depth value d is stored as the pixel value of each pixel and a confidence map in which the confidence degree conf is stored as the pixel value of each pixel, and outputs the depth map and the confidence map to the outside.

<3. Detailed Configuration Example of Ranging Sensor>

Figure 6:
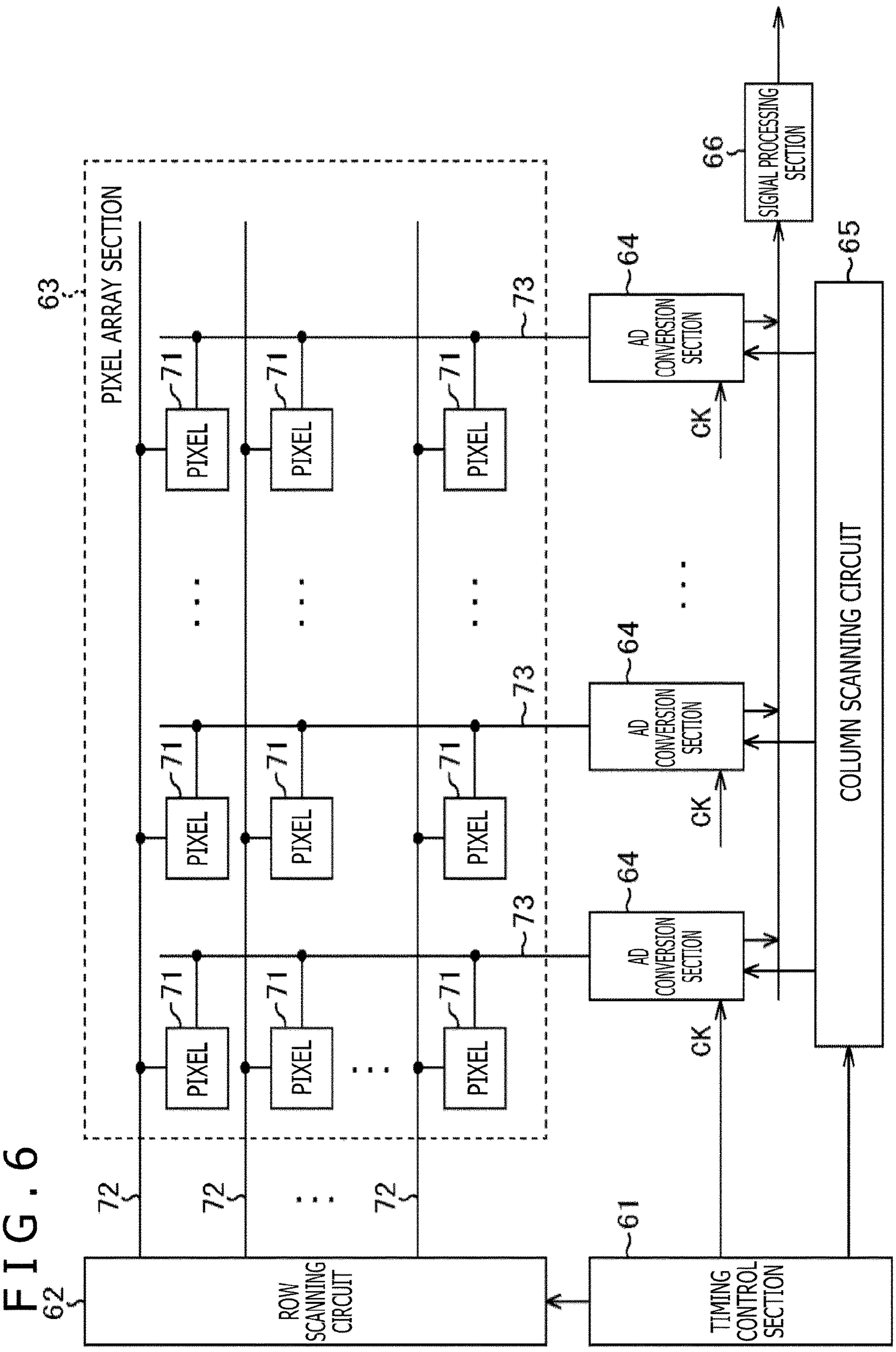
FIG. 6 is a block diagram depicting a detailed configuration example of the ranging sensor.

FIG. 6 is a block diagram depicting a detailed configuration example of the ranging sensor 13.

The ranging sensor 13 includes a timing control section 61, a row scanning circuit 62, the pixel array section 63, multiple AD (Analog to Digital) conversion sections 64, a column scanning circuit 65, and a signal processing section 66. In the pixel array section 63, multiple pixels 71 are two-dimensionally arranged in the row direction and the column direction, that is, in the matrix. Here, the row direction is the arrangement direction of the pixels 71 in the horizontal direction, and the column direction is the arrangement direction of the pixels 71 in the vertical direction. The row direction is the horizontal direction in FIG. 6, and the column direction is the vertical direction in FIG. 6.

The timing control section 61 includes, for example, a timing generator for generating various timing signals. The timing control section 61 generates various timing signals in synchronization with a light emission timing signal supplied from the light emission control section 12 (FIG. 1) and supplies the timing signals to the row scanning circuit 62, the AD conversion sections 64, and the column scanning circuit 65. Further, the timing control section 61 controls, on the basis of a to-be-illuminated area signal supplied from the light emission control section 12, the row scanning circuit 62, the AD conversion sections 64, and the column scanning circuit 65 to drive only a desired area of the pixel array section 63.

The row scanning circuit 62 includes, for example, a shift register or an address decoder and drives the pixels 71 in the pixel array section 63 all at once or row by row, for example. The pixel 71 receives reflected light under the control of the row scanning circuit 62 and outputs a detection signal (pixel signal) at a level based on the amount of the received light. The details of the pixel 71 are described later with reference to FIG. 7.

In the matrix pixel arrangement of the pixel array section 63, a pixel drive line 72 is wired along the horizontal direction in each pixel row, and a vertical signal line 73 is wired along the vertical direction in each pixel column. The pixel drive line 72 transmits a drive signal for driving for reading out detection signals from the pixels 71. Although the pixel drive line 72 is depicted as a single wire in FIG. 6, the pixel drive line 72 includes multiple wires in practice. In a similar manner, although the vertical signal line 73 is depicted as a single wire, the vertical signal line 73 includes multiple wires in practice.

The AD conversion section 64 is provided in each pixel column, for example, and performs, in synchronization with a clock signal CK supplied from the timing control section 61, the AD conversion of a detection signal supplied from each of the pixels 71 in the corresponding pixel column through the vertical signal line 73. Under the control of the column scanning circuit 65, the AD conversion section 64 outputs the detection signal (detection data) that has been subjected to the AD conversion, to the signal processing section 66. Note that the AD conversion section 64 may be arranged in each unit of multiple pixel columns instead of being arranged in each single pixel column. The column scanning circuit 65 selects the AD conversion sections 64 one by one and causes the AD conversion section 64 to output detection data that has been subjected to the AD conversion, to the signal processing section 66.

The signal processing section 66 has at least an arithmetic processing function and performs various types of signal processing such as arithmetic processing on the basis of detection data output from the AD conversion sections 64.

<Configuration Example of Pixel>

Figure 7:
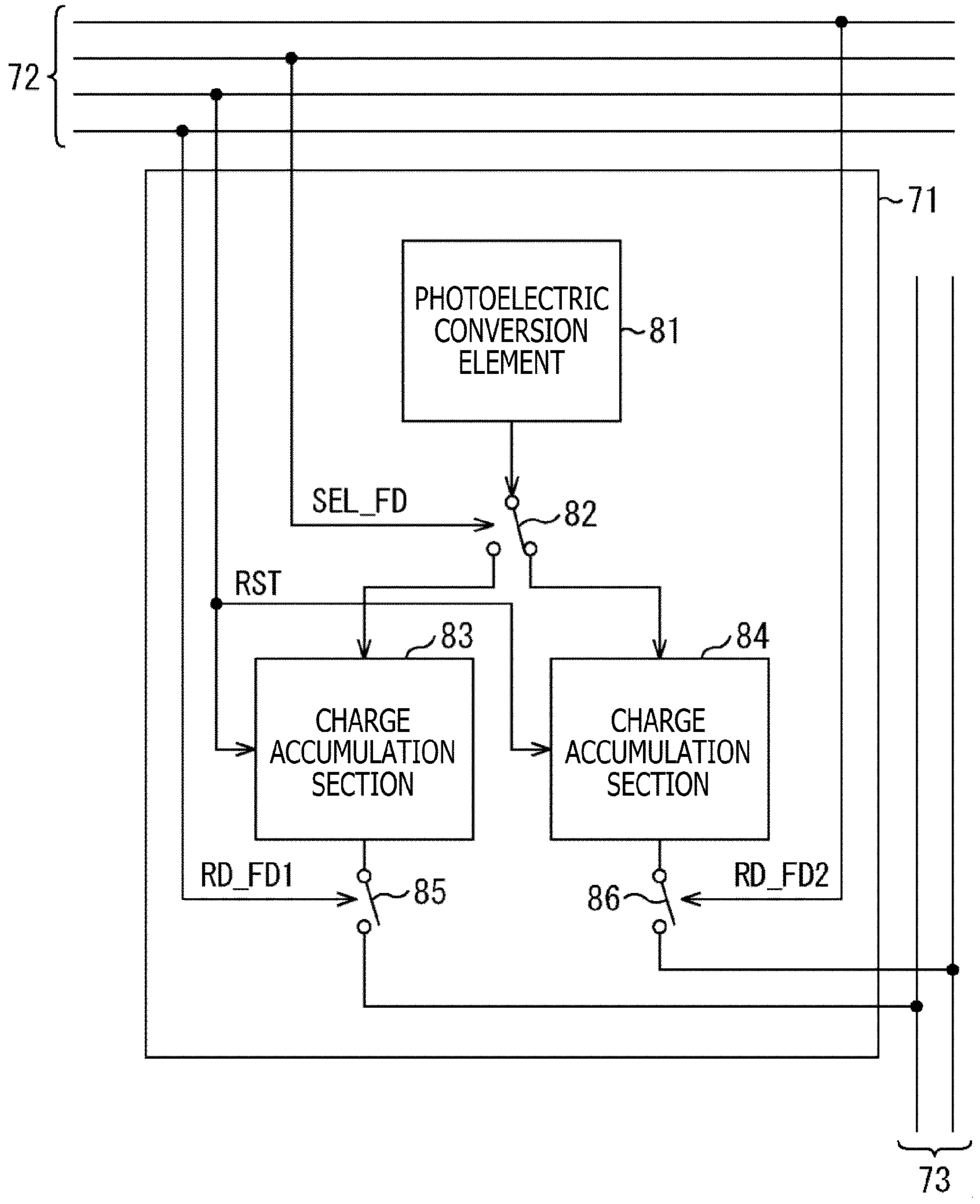
FIG. 7 is a block diagram depicting a configuration example of a pixel.

FIG. 7 is a block diagram depicting a configuration example of the pixel 71.

The pixel 71 includes a photoelectric conversion element 81, a transfer switch 82, charge accumulation sections 83 and 84, and selection switches 85 and 86.

The photoelectric conversion element 81 includes, for example, a photodiode and performs the photoelectric conversion of reflected light to generate charges.

The transfer switch 82 transfers charges generated by the photoelectric conversion element 81, to either the charge accumulation section 83 or 84 on the basis of a transfer signal SEL_FD. The transfer switch 82 includes, for example, a pair of MOS (Metal-Oxide-Semiconductor) transistors.

The charge accumulation sections 83 and 84 include, for example, floating diffusion layers. The charge accumulation sections 83 and 84 accumulate charges and generate voltages based on the accumulated charges. The charges accumulated in the charge accumulation sections 83 and 84 can be reset on the basis of a reset signal RST.

The selection switch 85 selects the output of the charge accumulation section 83 on the basis of a selection signal RD_FD1. The selection switch 86 selects the output of the charge accumulation section 84 on the basis of a selection signal RD_FD2. That is, when the selection switch 85 or 86 is turned on according to the selection signal RD_FD1 or RD_FD2, a voltage signal based on the charges accumulated in the charge accumulation section 83 or 84 that has been turned on is output to the AD conversion section 64 as a detection signal through the vertical signal line 73. The selection switches 85 and 86 each include, for example, a MOS transistor.

The wire for transmitting the transfer signal SEL_FD, the reset signal RST, and the selection signals RD_FD1 and RD_FD2 corresponds to the pixel drive line 72 in FIG. 6.

When the charge accumulation section 83 and the charge accumulation section 84 are referred to as a "first tap" and a "second tap," respectively, the pixel 71 accumulates charges generated by the photoelectric conversion element 81, in the first tap and the second tap alternately, for example, so that detection signals at two light reception timings in the opposite phases, such as the phase of zero degrees and the phase of 180 degrees, can be acquired in a single frame. In the next frame, detection signals at two light reception timings in the phase of 90 degrees and the phase of 270 degrees can be acquired.

The ranging sensor 13 described with reference to FIG. 6, in which the AD conversion section 64 is arranged in each pixel column, is of a system called the column AD system.

The ranging sensor 13 can perform reception operation with the light-receiving area divided in association with the 5×5=25 divided areas serving as an irradiation control unit, which are depicted in FIGS. 2A and 2B. Specifically, the pixel array section 63 that is the entire light-receiving area of the ranging sensor 13 is divided into 5×5=25 divided areas in association with the irradiation area of the lighting device 11.

Figure 8:
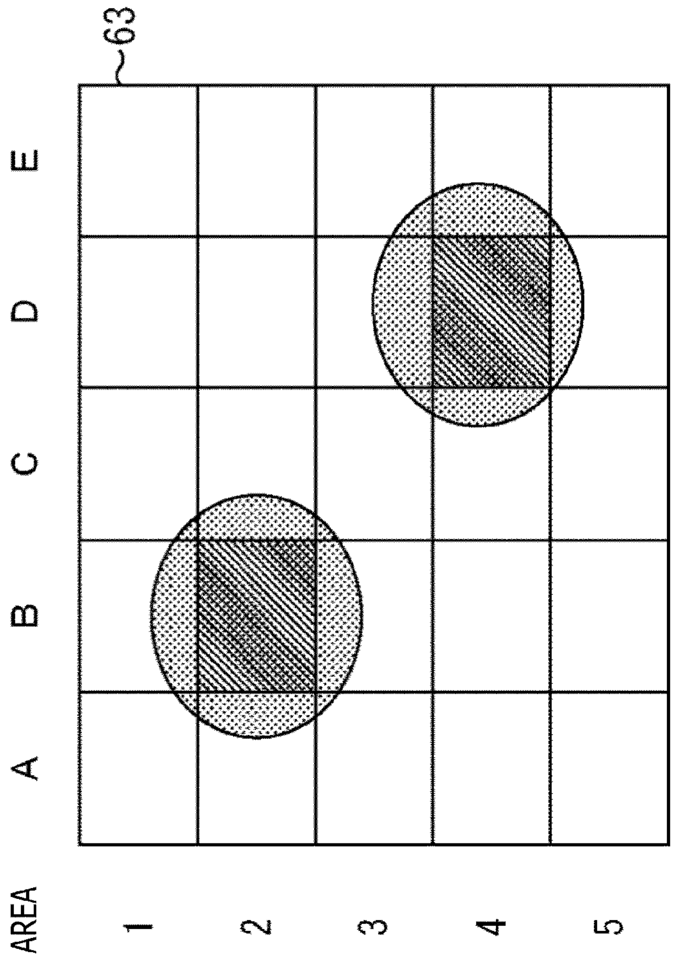
FIG. 8 is a diagram for explaining the drive control of a column AD ranging sensor.

As depicted in FIG. 8, the rows of the divided areas arranged in the column direction of the pixel array section 63 are sequentially denoted by 1 to 5, and the columns of the divided areas arrange in the row direction are sequentially denoted by A to E. It is assumed that, as depicted in FIG. 2B, the two divided areas, namely, a divided area (2, B) in the area row 2 and the area column B and a divided area (4, D) in the area row 4 and the area row D, correspond to the light-receiving area of the pixel array section 63 that corresponds to the irradiation area of the lighting device 11.

In this case, the timing control section 61 of the column AD ranging sensor 13 drives the row scanning circuit 62 such that the pixels 71 in the respective divided areas in the area row 2 and the area row 4 perform reception operation, and drives only the AD conversion sections 64 corresponding to the pixel columns in the area column B and the area column D. With such partial drive, as compared to a case where the entire light-receiving area of the pixel array section 63 is driven, the power consumption can be reduced to 2/5, and in a case of the same power consumption, the light emission intensity per divided area can be increased.

As the arrangement method for the AD conversion sections 64 in the ranging sensor 13, other than the column AD system described above, there is a system called the area AD system in which the AD conversion section 64 is arranged in each unit of M×N pixels (M and N are integers equal to or larger than 1).

Figure 9:
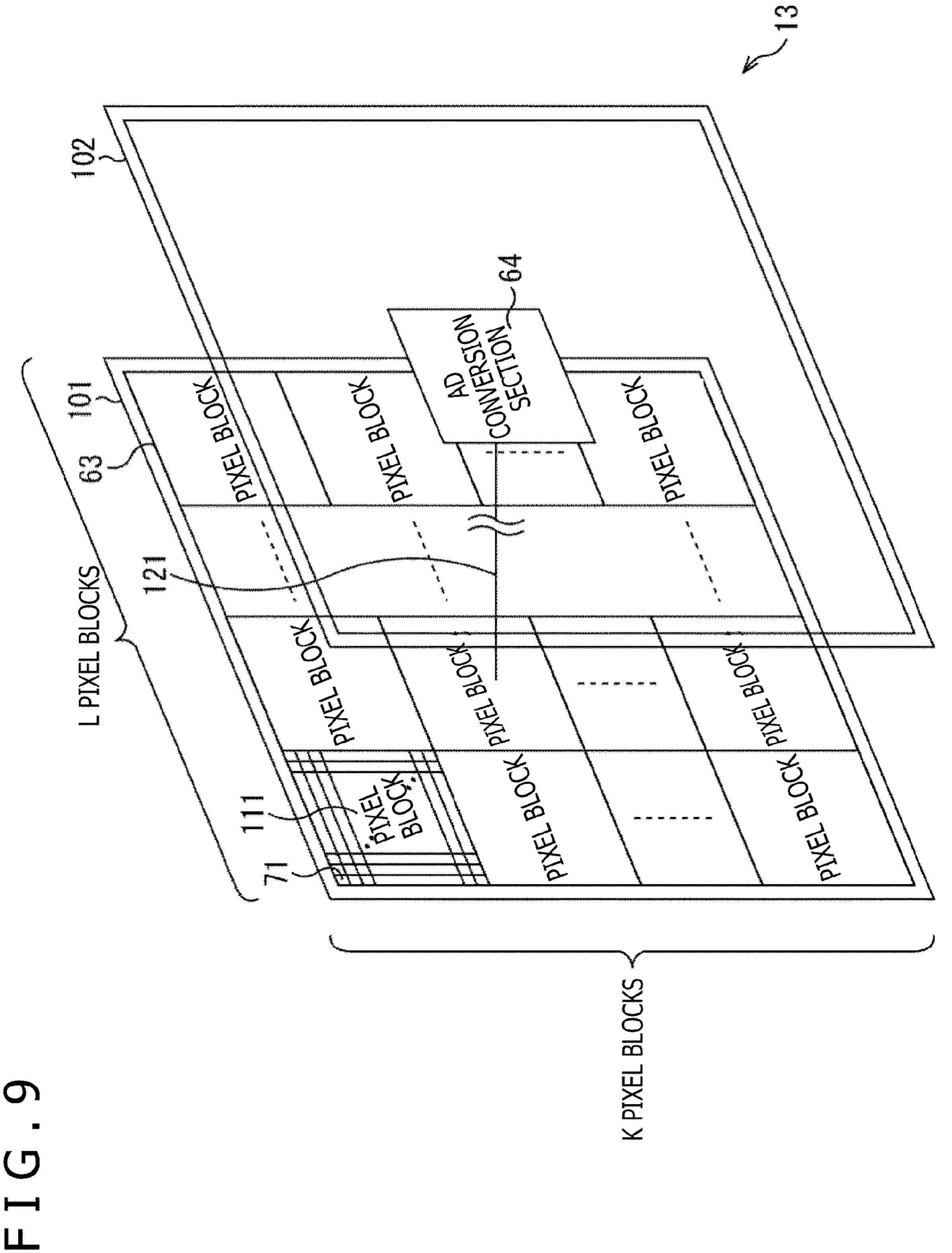
FIG. 9 is a diagram for explaining a configuration example of an area AD ranging sensor.

FIG. 9 depicts a configuration example of the ranging sensor 13 in a case where the AD conversion sections 64 are arranged on the basis of the area AD system.

In the case where the AD conversion sections 64 are arranged on the basis of the area AD system, the ranging sensor 13 includes, for example, a sensor die 101 and a logic die 102 that are stacked. The pixel array section 63 is formed on the sensor die 101, and the multiple AD conversion sections 64 are formed on the logic die 102.

The pixel array section 63 formed on the sensor die 101 is divided into L columns and K rows of the pixel blocks 111 (L and K are integers equal to or larger than 1), and the single pixel block 111 includes M columns and N rows of the pixels 71 (M and N are integers equal to or larger than 1).

On the logic die 102, the AD conversion sections 64 equal in number to the pixel blocks 111, that is, the L×K AD conversion sections 64 arranged in L columns and K rows, are formed. On the logic die 102, the single AD conversion section 64 has substantially the same size as the single pixel block 111 and is placed at a position facing the single pixel block 111.

Figure 10:
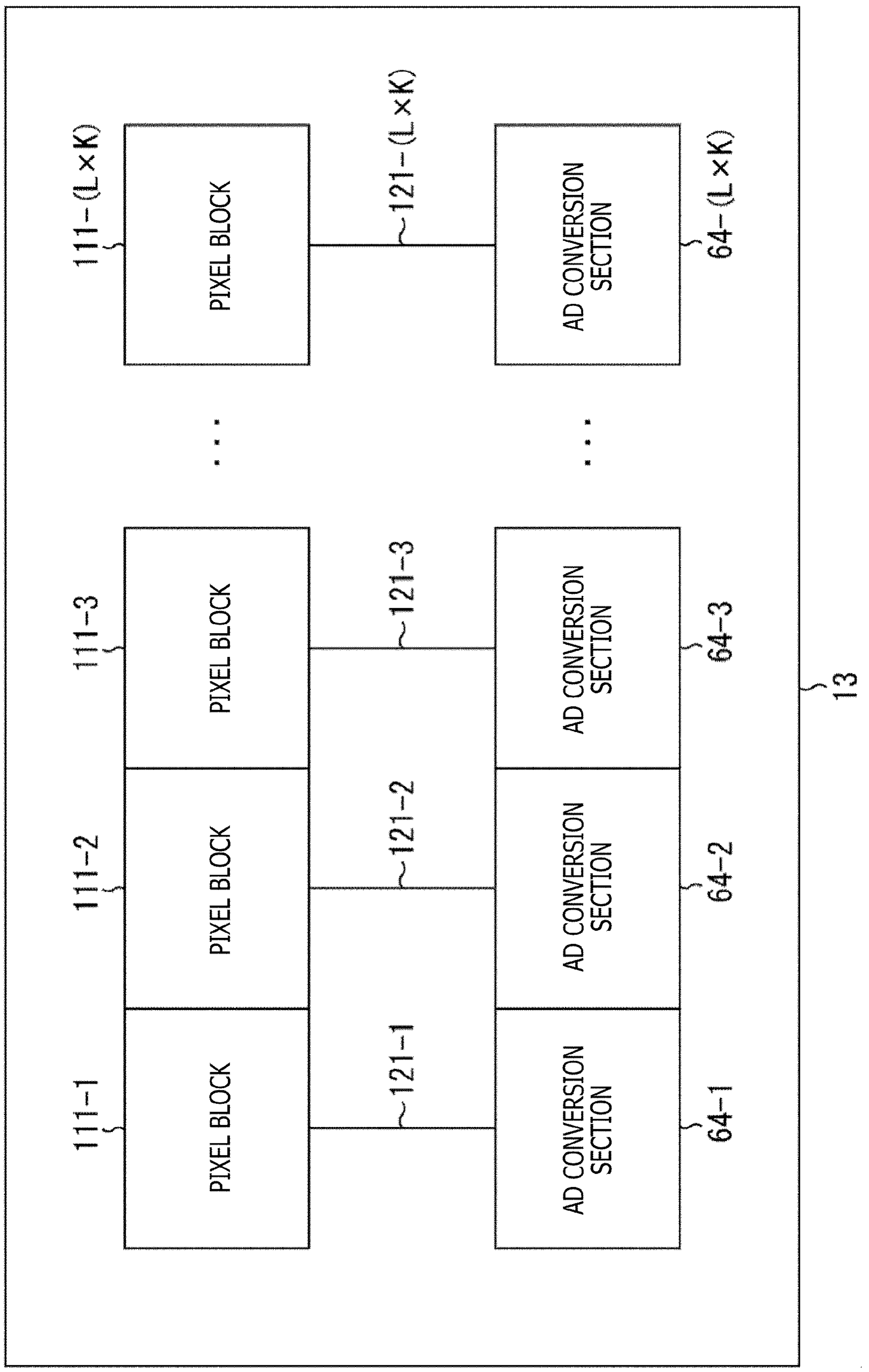
FIG. 10 is a diagram for explaining the configuration example of the area AD ranging sensor.

There is a one-to-one correspondence between the AD conversion sections 64 of the logic die 102 and the pixel blocks 111 formed at the same planar positions on the sensor die 101, and the AD conversion section 64 performs the AD conversion of a detection signal output from each of the pixels 71 in the corresponding pixel block 111. Thus, as depicted in FIG. 10, the multiple AD conversion sections 64 are provided such that the (L×K) pixel blocks 111 and the (L×K) AD conversion sections 64 are in a one-to-one correspondence.

Each of the pixels 71 in the pixel block 111 formed on the sensor die 101 in FIG. 9 and the AD conversion section 64 corresponding to the pixel block 111 are electrically connected to each other by a signal line 121. The sensor die 101 and the logic die 102 can electrically be connected to each other by, for example, a same metal junction such as a conductor via (VIA), a through-silicon via (TSV), a Cu—Cu junction, an Au—Au junction, or an Al—Al junction, or a different metal junction such as a Cu—Au junction, a Cu—Al junction, or an Au—Al junction.

In a case where such an area ADC ranging sensor 13 performs reception operation with respect to the 5×5=25 divided areas as depicted in FIGS. 2A, 2B, and, for example, the number of the pixel blocks 111 in each of the vertical direction and horizontal direction is set to five to divide the pixel array section 63 into the L×K=5×5=25 pixel blocks 111.

Further, when the two divided areas, namely, the divided area (2, B) in the area row 2 and the area column B and the divided area (4, D) in the area row 4 and the area column D, correspond to the irradiation area of the lighting device 11 as described with reference to FIG. 8, the timing control section 61 of the area ADC ranging sensor 13 drives only the pixel blocks 111 in the divided area (2, B) and the divided area (4, D) to perform reception operation. With such partial drive, as compared to the case where the entire light-receiving area of the pixel array section 63 is driven, the power consumption can be reduced to 2/25, and in a case of the same power consumption, the light emission intensity per divided area can be increased.

Further, in a case where the lighting device 11 irradiates the two divided areas, namely, the divided area (2, B) and the divided area (4, D), sequentially (in a time division manner) instead of irradiating the two divided areas at the same time, and where the ranging sensor 13 performs reception operation in the divided area (2, B) and the divided area (4, D) sequentially, as compared to the case where the entire light-receiving area of the pixel array section 63 is driven, the power consumption can be reduced to 1/25, and in a case of the same power consumption, the light emission intensity per divided area can be further increased.

Moreover, M and N can be 1, that is, the single pixel block 111 can include a single pixel, and the AD conversion section 64 can be arranged in each pixel. This drive control is called the pixel AD system. In this case, whether or not to perform reception operation can be controlled on a pixel basis instead of an area basis including multiple pixels.

<4. Configuration Example of Lighting Device>

Next, described is a specific configuration example of the lighting device 11 that is capable of controlling an on-and-off state of irradiation on a divided-area basis. The divided areas are obtained by dividing the entire irradiatable area into multiple areas.

Figure 11:
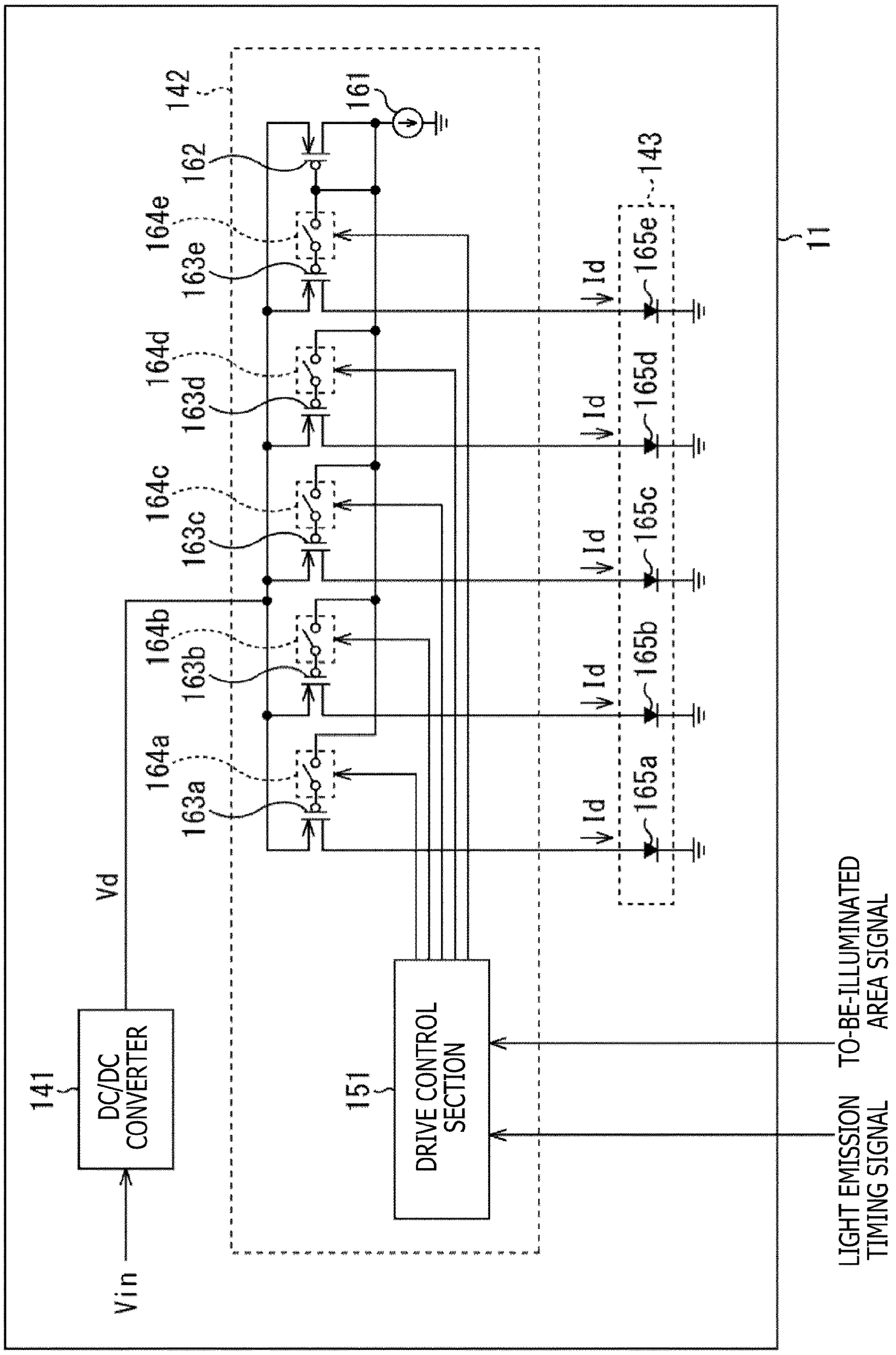
FIG. 11 is a diagram depicting a circuit configuration example of a lighting device.

FIG. 11 depicts a circuit configuration example of the lighting device 11, more specifically, a circuit configuration example corresponding to a predetermined area column which is one of the area columns A to E in the case where the entire irradiatable area of the lighting device 11 is divided into the 5×5=25 divided areas depicted in FIGS. 2A and 2B.

The lighting device 11 in FIG. 11 includes a DC/DC converter 141 serving as a power source, a drive section 142, and a light-emitting section 143.

The drive section 142 includes a drive control section 151, a constant current source 161, transistors 162 and 163*a* to 163*e*, and switches 164*a* to 164*e*. The light-emitting section 143 includes light-emitting elements 165*a* to 165*d*. The transistors 162 and 163*a* to 163*e* include, for example, P channel MOSFETs (MOS: metal-oxide-semiconductor and FET: field-effect transistor). The switches 164*a* to 164*e* include, for example, N channel MOSFETs. The light-emitting elements 165*a* to 165*d* include, for example, VCSELs.

The transistor 162 has a source connected to an output line of the DC/DC converter 141, a drain connected to a ground (GND) through the constant current source 161, and a gate connected to the drain. Further, the gate of the transistor 162 is connected to respective gates of the transistors 163*a* to 163*e* through the switches 164*a* to 164*e*.

Sources of the transistors 163*a* to 163*e* are connected to the output line of the DC/DC converter 141, drains of the transistors 163*a* to 163*e* are connected to anodes of the corresponding light-emitting elements 165*a* to 165*d*, and the gates of the transistors 163*a* to 163*e* are connected to the gate and drain of the transistor 162 through the switches 164*a* to 164*e*.

The DC/DC converter 141 converts a DC input voltage Vin to an output voltage Vd and supplies the output voltage Vd to the sources of the transistors 162 and 163*a* to 163*e*.

The drive control section 151 turns on and off the switches 164*a* to 164*e* on the basis of a light emission timing signal and a to-be-illuminated area signal that are supplied from the light emission control section 12 (FIG. 1). Specifically, the drive control section 151 turns on the switches 164*a* to 164*e* corresponding to divided areas for which a light emission timing signal of High and a to-be-illuminated area signal indicating irradiation are given.

In a case where the switches 164*a* to 164*e* are turned on, the constant current source 161 and the transistors 162 and 163*a* to 163*e* form a current mirror circuit, so that a current Id that is the same as a current Id flowing through the transistor 162 flows through the transistors 163*a* to 163*e* and is also supplied to the light-emitting elements 165*a* to 165*d* as a drive current Id. As a result, the light-emitting elements 165*a* to 165*d* emit light.

In a case where the switches 164*a* to 164*e* are turned off, the drive current Id does not flow through the light-emitting elements 165*a* to 165*d*, so that the light-emitting elements 165*a* to 165*d* do not emit light.

The lighting device 11 includes the circuit depicted in FIG. 11, in each of the area columns A to E in the 5×5=25 divided areas depicted in FIG. 8, for example.

In the circuit configuration in FIG. 11, the same drive current Id flows through the light-emitting elements 165*a* to 165*d* in the case where the switches 164*a* to 164*e* are controlled to be turned on. Therefore, in a case where the light emission intensity is changed in each divided area, the light emission period integration time (total time) is changed. That is, in a case where the light emission intensity is to be increased, the light emission period integration time is controlled to be lengthened, and in a case where the light emission intensity is to be reduced, the light emission period integration time is controlled to be shortened.

Besides, as a control method performed in a case where the light emission intensity is changed in each divided area, there can be employed a method that varies, with the divided areas having the same light emission period integration time, the output voltage Vd of the DC/DC converter 141 to make the drive current Id that flows through the light-emitting elements 165*a* to 165*d* different.

Figure 12:
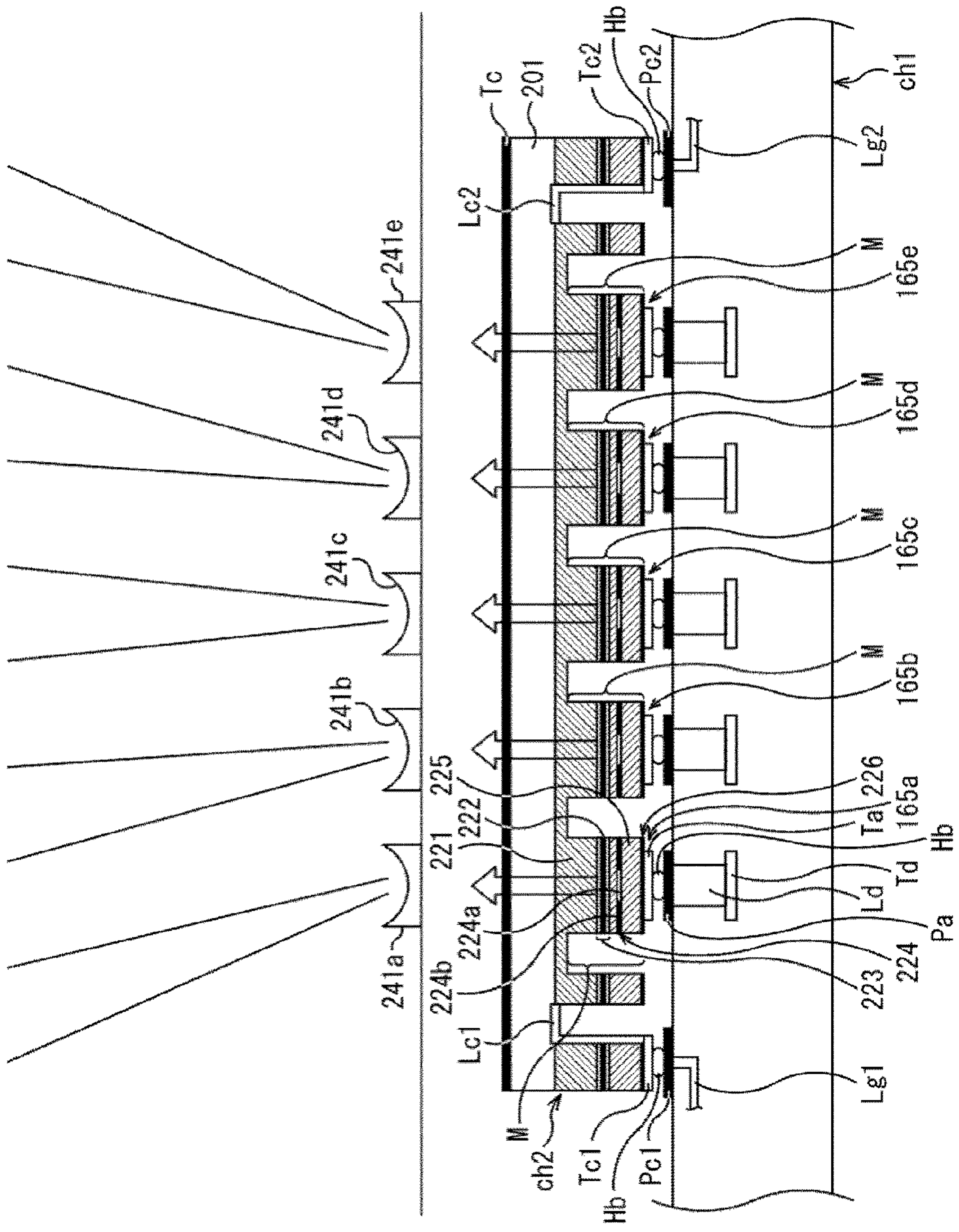
FIG. 12 is a sectional view depicting a substrate structure example of a light-emitting section of the lighting device.

FIG. 12 is a sectional view depicting a substrate structure example of the light-emitting section 143 of the lighting device 11.

In FIG. 12, on a chip Ch1 having a drive circuit formed thereon, a chip Ch2 having the light-emitting elements 165*a* to 165*d* formed thereon is mounted.

In the chip Ch2, on the front side (lower side in FIG. 12) of a semiconductor substrate 201, five mesas M corresponding to the light-emitting elements 165 are arranged in the planar direction. The semiconductor substrate 201 is used as a substrate of the chip Ch2, and as the semiconductor substrate 201, for example, a GaAs (gallium arsenide) substrate is used. In FIG. 12, the light-emitting elements 165 each have a back-illuminated cross-sectional structure that emits light toward a back surface of the semiconductor substrate 201, and a cathode electrode Tc is formed on the back side, which is the upper side in FIG. 12, of the semiconductor substrate 201.

In each of the mesas M on the front side of the semiconductor substrate 201, in order from the upper layer side to the lower layer side, a first multilayer reflective mirror layer 221, an active layer 222, a second multilayer reflective mirror layer 225, a contact layer 226, and an anode electrode Ta are formed.

A current confining layer 224 is formed in part of the second multilayer reflective mirror layer 225. Further, a portion that includes the active layer 222 and is sandwiched between the first multilayer reflective mirror layer 221 and the second multilayer reflective mirror layer 225 serves as a resonator 223.

The first multilayer reflective mirror layer 221 includes an N-type conductivity compound semiconductor, and the second multilayer reflective mirror layer 225 includes an N-type conductivity compound semiconductor.

The active layer 222 is a layer for generating laser light, and the current confining layer 224 is a layer for efficiently injecting a current into the active layer 222 and providing the lens effect.

The current confining layer 224 which is not oxidized is subjected to selective oxidation after the formation of the mesas M, and thus have a central oxidized region (or selectively oxidized region) 224*a* and a non-oxidized region 224*b* which is not oxidized and which surrounds the oxidized region 224*a*. In the current confining layer 224, the oxidized region 224*a* and the non-oxidized region 224*b* form a current confining structure, and a current flows through a current confining region that is the non-oxidized region 224*b*.

The contact layer 226 is provided for enhancing the ohmic contact with the anode electrode Ta.

The light-emitting elements 165 each have a pad Pa for an electrical connection with the anode electrode Ta. In the wiring layer of the chip Ch1, a wire Ld is formed for each of the pads Pa. Although not depicted, by the wire Ld, each of the pads Pa is connected to the drain of the corresponding transistor 163 in the chip Ch1.

Further, in the chip Ch2, the cathode electrode Tc is connected to an electrode Tc1 through a wire Lc1 and to an electrode Tc2 through a wire Lc2. The electrode Tc1 is connected to a pad Pc1 formed on the chip Ch1 through a solder bump Hb, and the electrode Tc2 is connected to a pad Pc2 formed on the chip Ch1 through the solder bump Hb.

In the wiring layer of the chip Ch1, a ground wire Lg1 connected to the pad Pc1 and a ground wire Lg2 connected to the pad Pc2 are formed. Although not depicted, the ground wires Lg1 and Lg2 are connected to the ground.

Although the substrate structure example of the lighting device 11 depicted in FIG. 12 is a back-illuminated example that emits light from the back side of the semiconductor substrate 201, a front-illuminated structure can also be used. In this case, the contact layer 226 toward which light is emitted is formed into a shape with an opening formed at the central part thereof in plan view, such as an annular (ring) shape, that is, has an opening. Light generated by the active layer 222 oscillates back and forth in the resonator 223 and is then emitted to the outside through the opening portion.

On the upper side of the mesas M toward which the light-emitting elements 165*a* to 165*d* emit light, projection lenses 241*a* to 241*e* are arranged for the respective mesas M. The projection lens 241 irradiates the corresponding area with infrared light emitted from the mesa M located under the projection lens 241. For example, in a case where the projection lenses 241*a* to 241*e* in FIG. 12 correspond to the area column B in the 5×5=25 divided areas depicted in FIG. 8, the projection lens 241*a* irradiates the divided area (1, B) with infrared light, the projection lens 241*b* irradiates the divided area (2, B) with infrared light, the projection lens 241*c* irradiates the divided area (3, B) with infrared light, the projection lens 241*d* irradiates the divided area (4, B) with infrared light, and the projection lens 241*e* irradiates the divided area (5, B) with infrared light.

Figure 13:
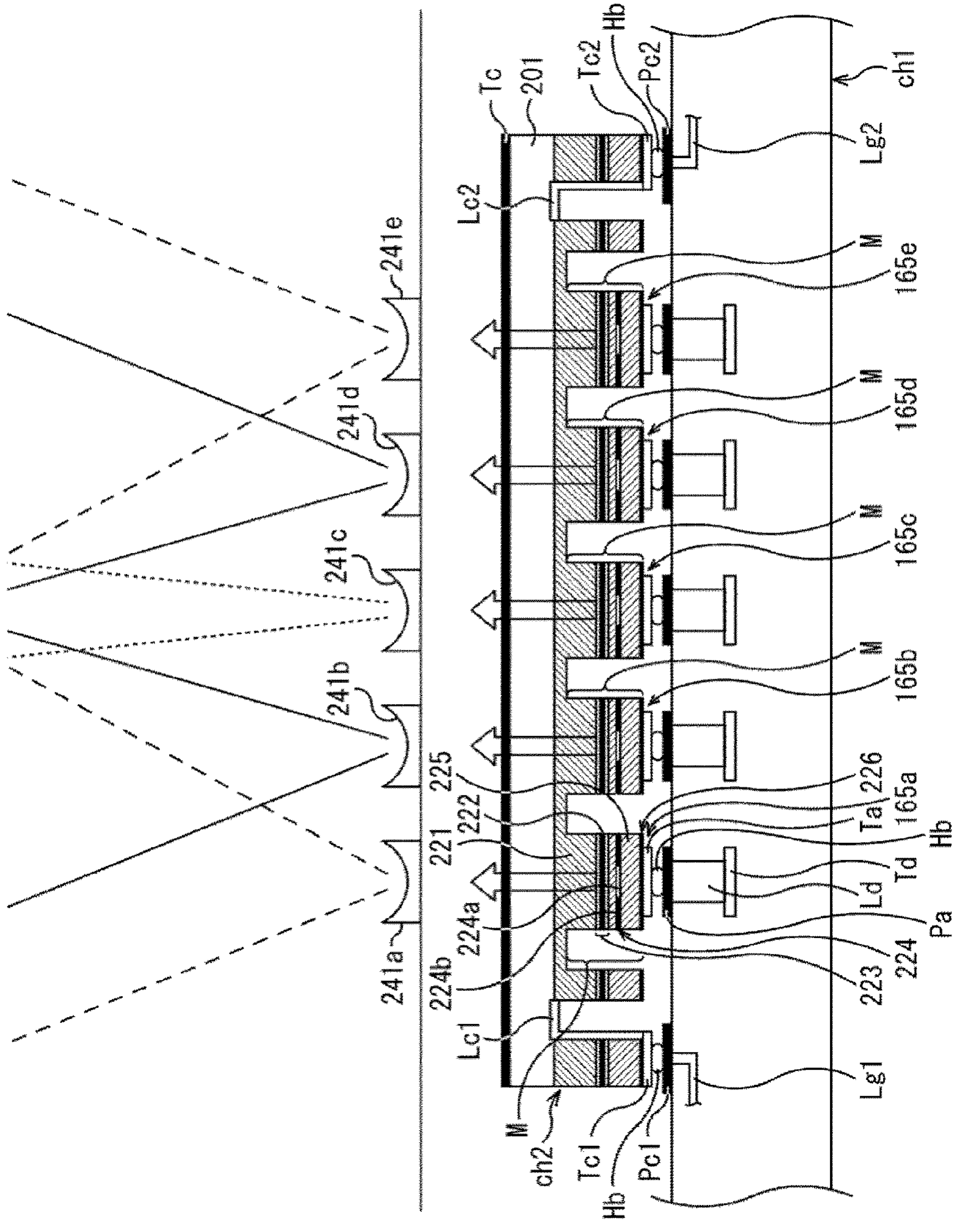
FIG. 13 is a diagram for explaining an irradiation area of the light-emitting section of the lighting device.

FIG. 12 is the example of the case where the light-emitting elements 165 and the divided areas are in a one-to-one correspondence and where the light-emitting elements 165 are the same in light distribution characteristics, but the light-emitting elements 165 may be different from each other in light distribution characteristics as depicted in FIG. 13.

Figure 14:
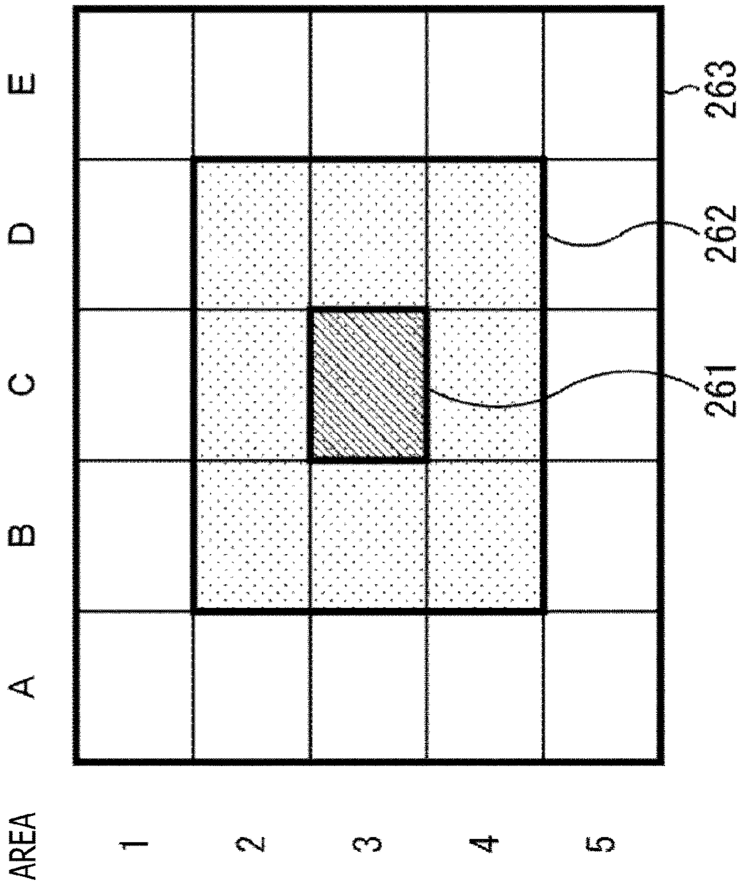
FIG. 14 is a diagram for explaining the irradiation area of the light-emitting section of the lighting device.

For example, the light-emitting elements 165 can also have the following light distribution characteristics: in a case where a single light-emitting element 165 emits light, only an area 261 of all the 5×5=25 divided areas that is indicated by the diagonal lines in FIG. 14 is irradiated with infrared light, in a case where another single light-emitting element 165 emits light, only a central 3×3 area 262 indicated by the dots in FIG. 14 is irradiated with infrared light, and in a case where still another single light-emitting element 165 emits light, a 5×5 area 263 that is the entire area is irradiated with infrared light.

With such a combination of the light-emitting elements 165 and the to-be-illuminated areas, the number of the light-emitting elements 165 can be smaller than the number of divided areas.

On the other hand, with the light-emitting elements 165 greater in number than the divided areas, finer light emission control may be performed.

Figure 15:
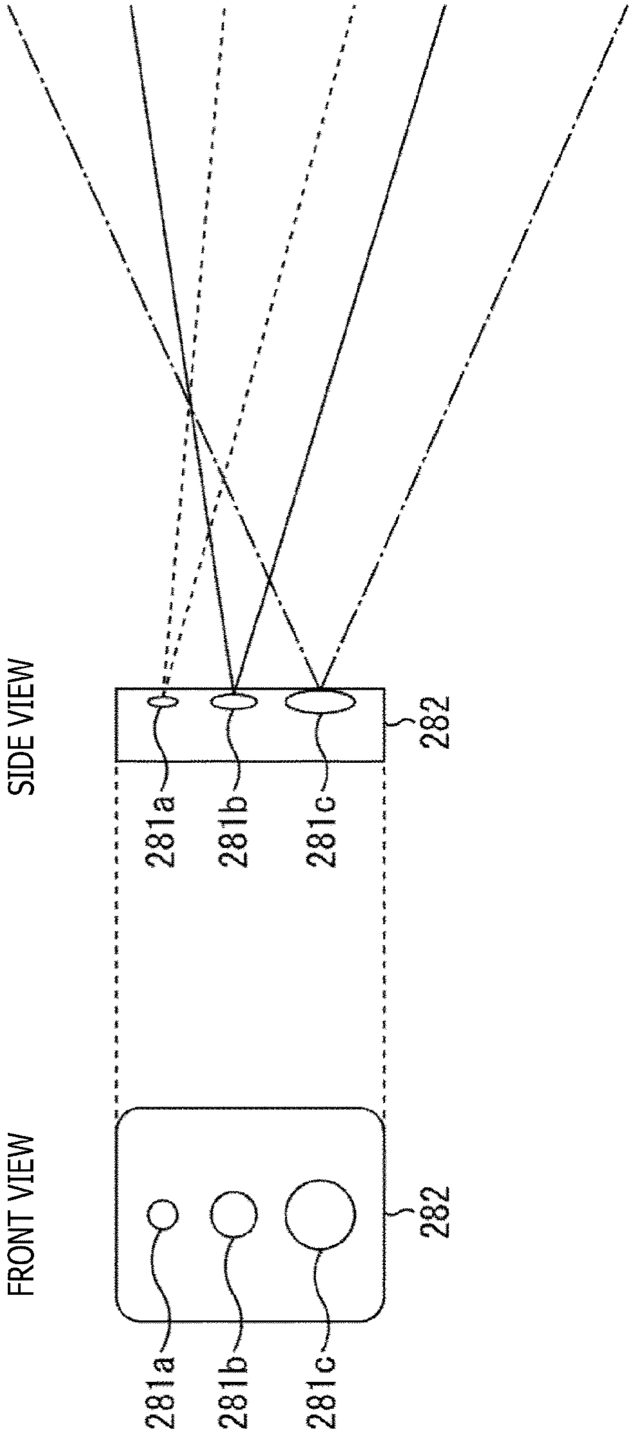
FIG. 15 is a diagram for explaining another configuration example of the light-emitting section of the lighting device.

For example, as depicted in FIG. 15, a light-emitting unit 282 including three light-emitting elements 281*a* to 281*c* can be provided in each of the 5×5=25 divided areas depicted in FIG. 8, and irradiation angles can be made different depending on which of the light-emitting elements 281*a* to 281*c* is caused to emit light.

<5. Processing Flow of Distance Measurement Processing>

Figure 16:
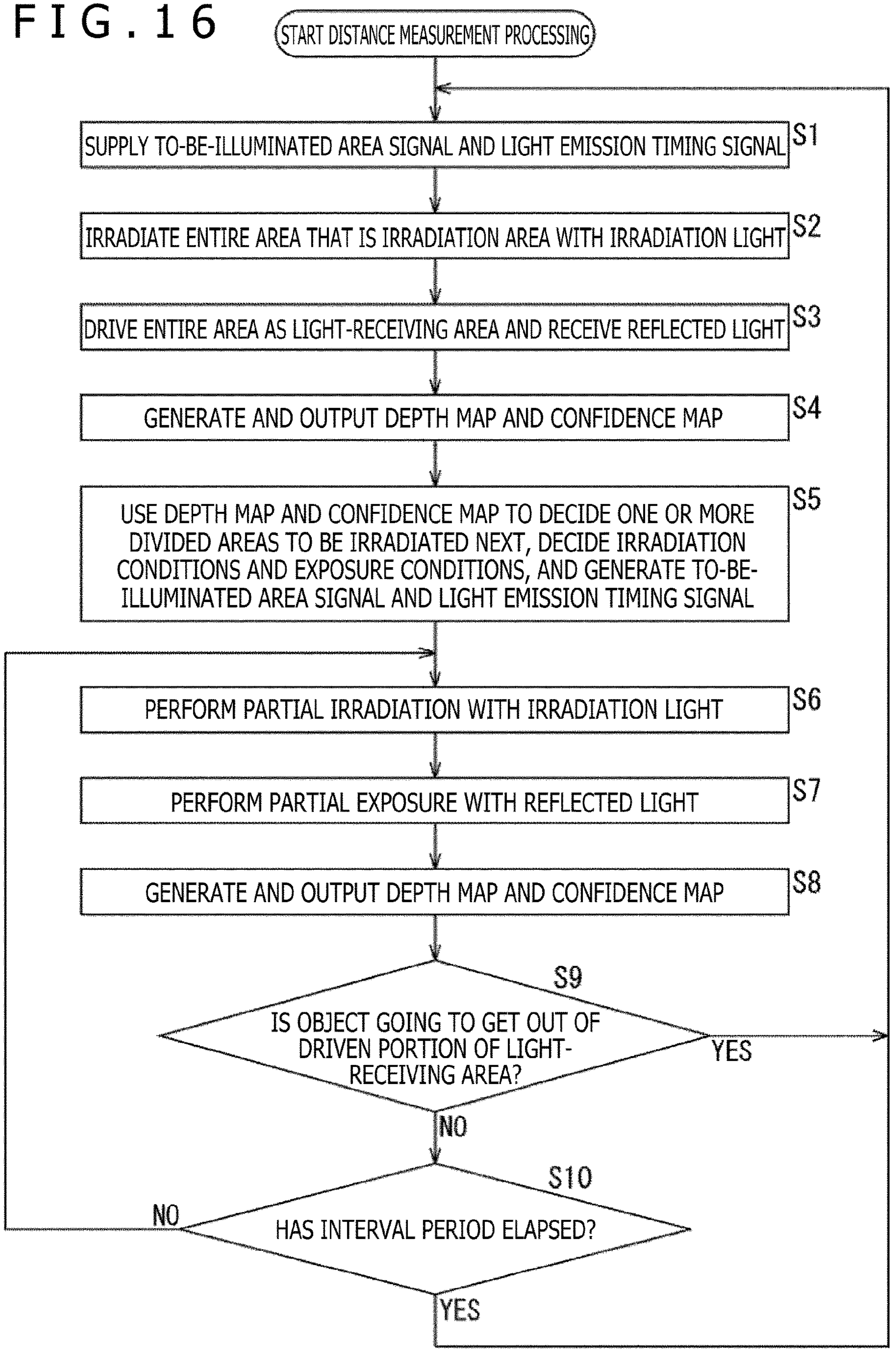
FIG. 16 is a flowchart for explaining distance measurement processing.

Next, with reference to the flowchart of FIG. 16, distance measurement processing by which the ranging system 1 in FIG. 1 measures the distance to the object 15 that is an object to be measured is described.

This processing starts when a distance measurement start instruction is supplied from a control section of a host device in which the ranging system 1 is incorporated, for example.

First, in Step S1, the light emission control section 12 supplies, to the lighting device 11 and the ranging sensor 13, a light emission timing signal and a to-be-illuminated area signal which indicates that an area to be illuminated is the entire irradiatable area of the lighting device 11.

In Step S2, the lighting device 11 irradiates, on the basis of the to-be-illuminated area signal and the light emission timing signal, the entire irradiatable area of the lighting device 11 that is the irradiation area, with irradiation light.

In Step S3, the ranging sensor 13 drives, on the basis of the to-be-illuminated area signal and the light emission timing signal, the entire area of the pixel array section 63 as a light-receiving area and receives the reflected light. The ranging sensor 13 supplies a detection signal based on the light amount of the received reflected light, to the signal processing section 14 pixel by pixel of the pixel array section 63.

In Step S4, the signal processing section 14 calculates, on the basis of the detection signal supplied from the ranging sensor 13 for each pixel 71 in the pixel array section 63, a depth value that is the distance from the ranging system 1 to the object 15. Then, the signal processing section 14 generates a depth map in which the depth value is stored as the pixel value of each of the pixels 71 and a confidence map in which a confidence degree is stored as the pixel value of each of the pixels 71, and outputs the depth map and the confidence map to the light emission control section 12 and the outside.

In Step S5, the light emission control section 12 uses the depth map and the confidence map that are supplied from the signal processing section 14, to decide one or more divided areas to be irradiated next, decide irradiation conditions and exposure conditions (light reception conditions), and generate a to-be-illuminated area signal and a light emission timing signal.

Specifically, first, the light emission control section 12 decides one or more divided areas to be irradiated next. In the following, divided areas for the lighting device 11 that have been decided to be irradiated next and portions of the light-receiving area of the pixel array section 63 that correspond to the divided areas are also collectively referred to as a "drive area." The drive area can be decided by identifying a light-receiving area with the use of a depth map and a confidence map, as described below.

For example, the light emission control section 12 uses a depth map and a confidence map to detect, as an area of interest, a face region of a person who is an object, a body region of a person who is an object, a region in which a moving object that is an object is present, a gaze region at which a person who is an object gazes, a saliency region in which a person is interested, or other regions. Thus, the light emission control section 12 can decide the detected area of interest as a light-receiving area. Alternatively, the light emission control section 12 may acquire a user specified region that is specified by the user, as an area of interest from the outside (host control section) and may then decide the user specified region as a light-receiving area. With the use of any other region detection techniques, a region having unique features in the maps can be detected as an area of interest and decided as a light-receiving area.

Then, the light emission control section 12 decides irradiation conditions and exposure conditions (light reception conditions) for each of the one or more drive areas.

The irradiation conditions for a drive area include, for example, the modulation frequency, the light emission period integration time, the Duty ratio indicating the ratio between the ON period and the OFF period of light emission in a single period, or the light emission intensity indicating the intensity of irradiation light. Those irradiation conditions can be set to different values between drive areas.

Meanwhile, the exposure conditions for a drive area include the frame rate, the exposure period integration time, the light sensitivity, or the like. The frame rate and the exposure period integration time correspond to the modulation frequency on the light emission side, the exposure period integration time corresponds to the light emission period integration time on the light emission side, and the light sensitivity corresponds to the light emission intensity on the light emission side. The light sensitivity can be changed as follows: in a case where the charge accumulation sections 83 and 84 of the pixel 71 each include two floating diffusion layers connected to each other in parallel through a switching MOS transistor, the connection and disconnection between the two floating diffusion layers is controlled by the MOS transistor to increase or decrease the storage capacitance, thereby changing the conversion efficiencies of the charge accumulation sections 83 and 84 in converting the accumulated charges to a voltage.

The irradiation conditions and exposure conditions for each drive area can be decided depending on the distance (depth value d) to an object, the reflectance ref of the object, the motion amount of the object, or the like.

In the end of Step S5, the light emission control section 12 generates a to-be-illuminated area signal and a light emission timing signal corresponding to the one or more divided areas that have been decided and the irradiation conditions and exposure conditions that have been decided, and supplies the to-be-illuminated area signal and the light emission timing signal to the lighting device 11 and the ranging sensor 13.

In Step S6, the lighting device 11 controls, on the basis of the light emission timing signal and the to-be-illuminated area signal that are supplied from the light emission control section 12, only some of the light-emitting elements 165 to emit light, thereby performing partial irradiation with the irradiation light.

In Step S7, the ranging sensor 13 drives, on the basis of the light emission timing signal and the to-be-illuminated area signal that are supplied from the light emission control section 12, only some portions of the light-receiving area of the pixel array section 63 to perform partial exposure with the reflected light from the object 15. The ranging sensor 13 supplies a detection signal based on the light amount of the reflected light received in the driven portions of the light-receiving area, to the signal processing section 14 pixel by pixel of the pixel array section 63.

The light emission by the lighting device 11 in Step S6 and the light reception by the ranging sensor 13 are partial irradiation and partial exposure in which only some of the multiple divided areas obtained by dividing the entire area are driven.

In Step S8, the signal processing section 14 generates, on the basis of the detection signal of each pixel in the portions of the light-receiving area supplied from the ranging sensor 13, a depth map and a confidence map and outputs the depth map and the confidence map to the light emission control section 12 and the outside.

In Step S9, the light emission control section 12 calculates the motion amount of the object included in the light-receiving area, on the basis of the depth map and the confidence map that are supplied from the signal processing section 14 and a depth map and a confidence map in the previous frame. Then, the light emission control section 12 determines, on the basis of the calculated motion amount, whether the object is going to get out of the driven portions of the light-receiving area.

In a case where it is determined in Step S9 that the object is going to get out of the driven portions of the light-receiving area, the processing returns to Step S1, and Steps S1 to S9 described above are repeated. That is, the ranging system 1 executes light emission and light reception with respect to the entire area to identify a light-receiving area over again.

On the other hand, in a case where it is determined in Step S9 that the object is not going to get out of the driven portions of the light-receiving area, the processing proceeds to Step S10, and the light emission control section 12 determines whether an interval period has elapsed. The interval period is a time interval in which light emission and light reception with respect to the entire area are executed, and can be set in advance on a setting screen.

In a case where it is determined in Step S10 that the interval period has not elapsed yet, the processing returns to Step S6, and Steps S6 to S10 described above are repeated. That is, partial irradiation and partial exposure are continuously executed.

On the other hand, in a case where it is determined in Step S10 that the interval period has elapsed, the processing returns to Step S1, and Steps S1 to S9 described above are executed. With this, light emission and light reception with respect to the entire area are executed again to identify a light-receiving area over again.

The processing in Steps S1 to S10 described above is continuously executed until a distance measurement end instruction is supplied from the control section of the host device, for example, and ends when the distance measurement end instruction is supplied. Alternatively, the distance measurement processing may end when the object gets out of the entire area of the lighting device 11.

As described above, with the distance measurement processing that is executed by the ranging system 1, the lighting device 11 can perform partial irradiation to irradiate only some portions of the entire irradiatable area, and the irradiation area in partial irradiation can include multiple divided areas separated from each other. Further, the irradiation area in partial irradiation can adaptively be changed depending on an area of interest. The ranging sensor 13 can drive, in the distance measurement processing, only some portions corresponding to an irradiation area in partial irradiation, to receive light.

With the lighting device 11 for performing partial irradiation, the power consumption of the lighting device 11 can be reduced, and the measurement accuracy can also be improved by virtue of the increased light emission intensity with a narrowed irradiation area.

With the ranging sensor 13 for driving some portions corresponding to an irradiation area in partial irradiation, the power consumption of the ranging sensor 13 can be reduced, and signals can be read out at high speed with a narrowed signal read-out area.

Further, since the lighting device 11 can individually adjust the light emission intensity for each of multiple divided areas to be set to an irradiation area, a strong light emission intensity can be set for an object at a long distance that is present in a first divided area, and a weak light emission intensity can be set for an object at a short distance that is present in a second divided area. Therefore, the distances to the multiple objects at different distances can be measured in a single screen.

<6. Configuration Example of Electronic Device>

The ranging system 1 described above can be mounted on an electronic device such as a smartphone, a tablet device, a cell phone, a personal computer, a game console, a television receiver, a wearable device, a digital still camera, or a digital video camera.

Figure 17:
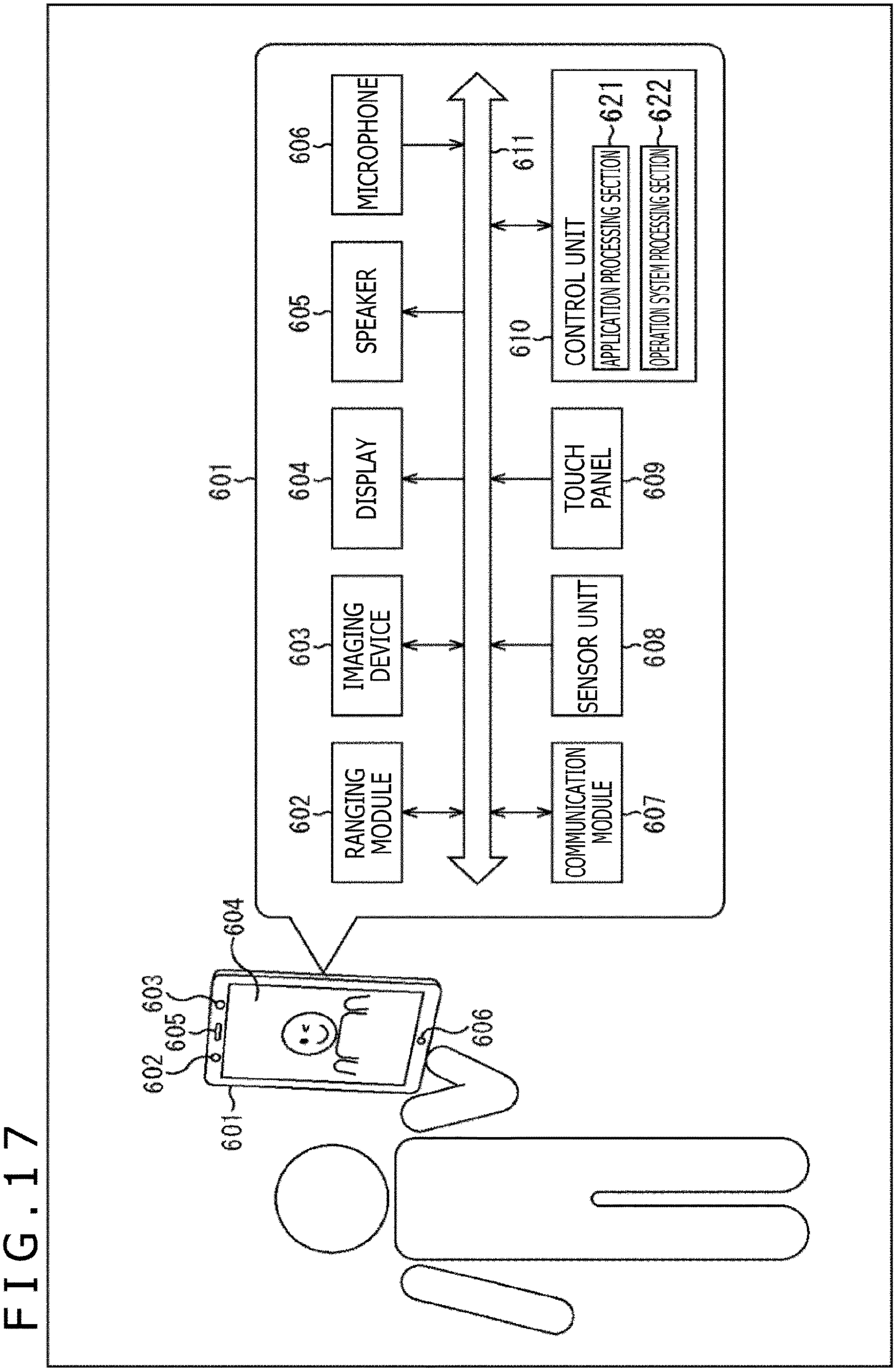
FIG. 17 is a block diagram depicting a configuration example of a smartphone that is an electronic device to which the present technology is applied.

FIG. 17 is a block diagram depicting a configuration example of a smartphone that is an electronic device having the ranging system 1 mounted thereon.

As depicted in FIG. 17, a smartphone 601 includes a ranging module 602, an imaging device 603, a display 604, a speaker 605, a microphone 606, a communication module 607, a sensor unit 608, a touch panel 609, and a control unit 610 that are connected to each other through a bus 611. Further, the control unit 610 functions, by running programs by the CPU, as an application processing section 621 and an operation system processing section 622.

The ranging system 1 in FIG. 1 that has been modularized is applied as the ranging module 602. For example, the ranging module 602 is placed on a front surface of the smartphone 601. The ranging module 602 can perform ranging with respect to a user of the smartphone 601 and output, as a ranging result, the depth value of the surface shape of the face, hands, fingers, or the like of the user.

The imaging device 603 is placed on the front surface of the smartphone 601 and images the user of the smartphone 601 as a subject to acquire the image of the user. Note that, although not depicted, the imaging device 603 may also be placed on a back surface of the smartphone 601.

The display 604 displays an operation screen for performing processing by the application processing section 621 and the operation system processing section 622, and displays an image captured by the imaging device 603, for example. In a call with the smartphone 601, the speaker 605 outputs the voice of a party on the other side, and the microphone 606 collects the voice of the user, for example.

The communication module 607 performs communication via a communication network. The sensor unit 608 senses speed, acceleration, proximity, or the like, and the touch panel 609 acquires a touch operation performed by the user on the operation screen displayed on the display 604.

The application processing section 621 performs processing for providing various services by the smartphone 601. For example, the application processing section 621 can perform processing of generating, on the basis of the depth supplied from the ranging module 602, a face by virtually reproducing the facial expressions of the user with the use of computer graphics and displaying the generated face on the display 604. Further, the application processing section 621 can perform processing of generating three-dimensional shape data of any three-dimensional object on the basis of the depth supplied from the ranging module 602, for example.

The operation system processing section 622 performs processing for realizing the basic functions and actions of the smartphone 601. For example, the operation system processing section 622 can perform processing of identifying the face of the user on the basis of a depth value supplied from the ranging module 602, to unlock the smartphone 601. Further, the operation system processing section 622 can perform processing of recognizing, for example, the user's gesture on the basis of a depth value supplied from the ranging module 602, to receive various operations based on the gesture as input.

With the application of the ranging system 1 described above, the smartphone 601 configured in such a manner can calculate, for example, ranging information regarding different objects at a long distance and a short distance. With this, the smartphone 601 can more accurately detect ranging information.

<7. Application Example to Mobile Body>

The technology according to the present disclosure (present technology) is applicable to various products. For example, the technology according to the present disclosure may be realized as a device that is mounted on any type of a mobile body such as an automobile, an electric vehicle, a hybrid electric vehicle, a motorcycle, a bicycle, a personal mobility, an airplane, a drone, a ship, or a robot.

Figure 18:
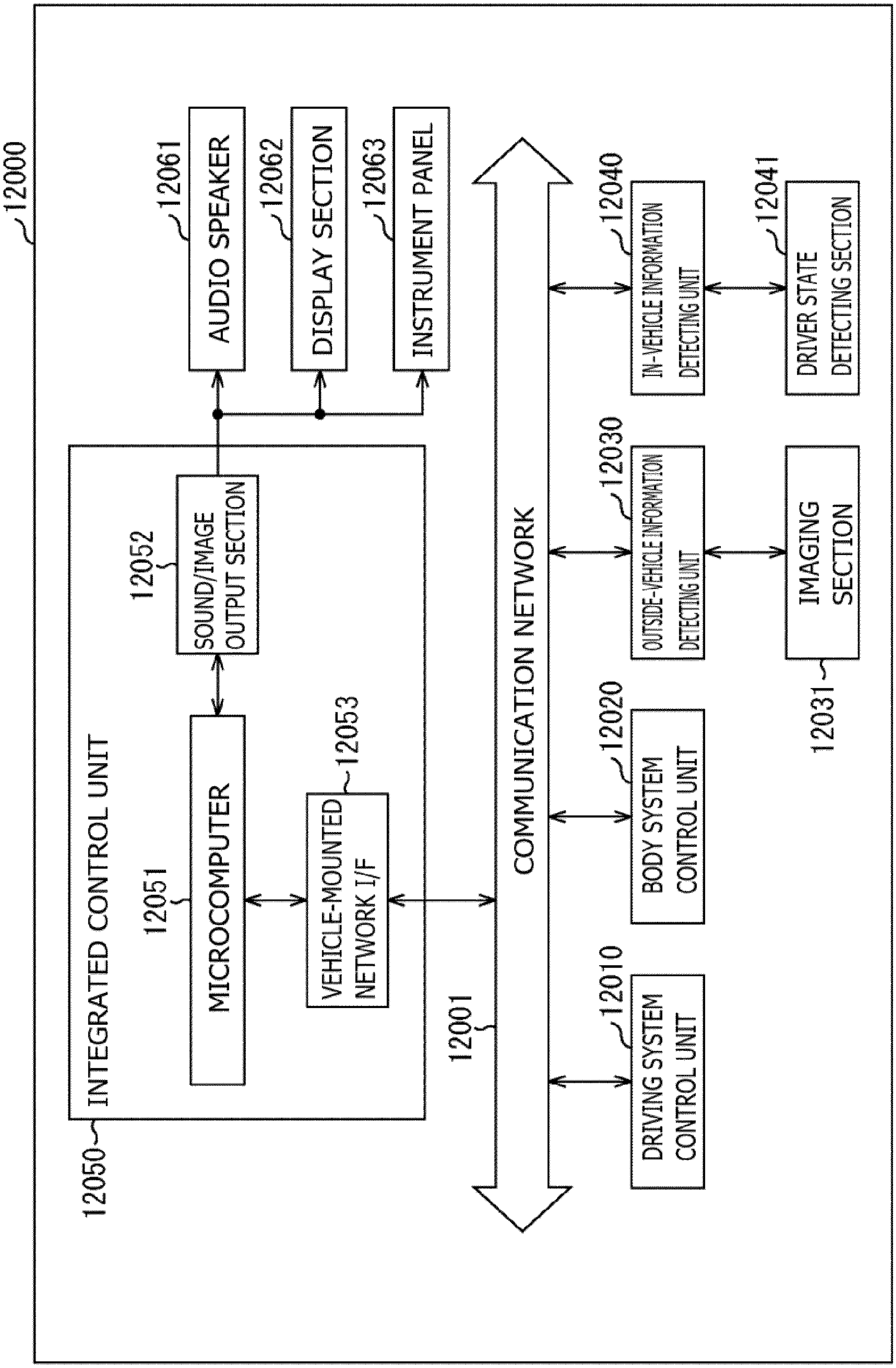
FIG. 18 is a block diagram depicting an example of schematic configuration of a vehicle control system.

FIG. 18 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 18, the vehicle control system 12000 includes a driving system control unit 12010, a body system control unit

12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 18, an audio speaker 12061, a display section 12062, and an instrument panel 12063 are illustrated as the output device. The display section 12062 may, for example, include at least one of an on-board display and a head-up display.

Figure 19:
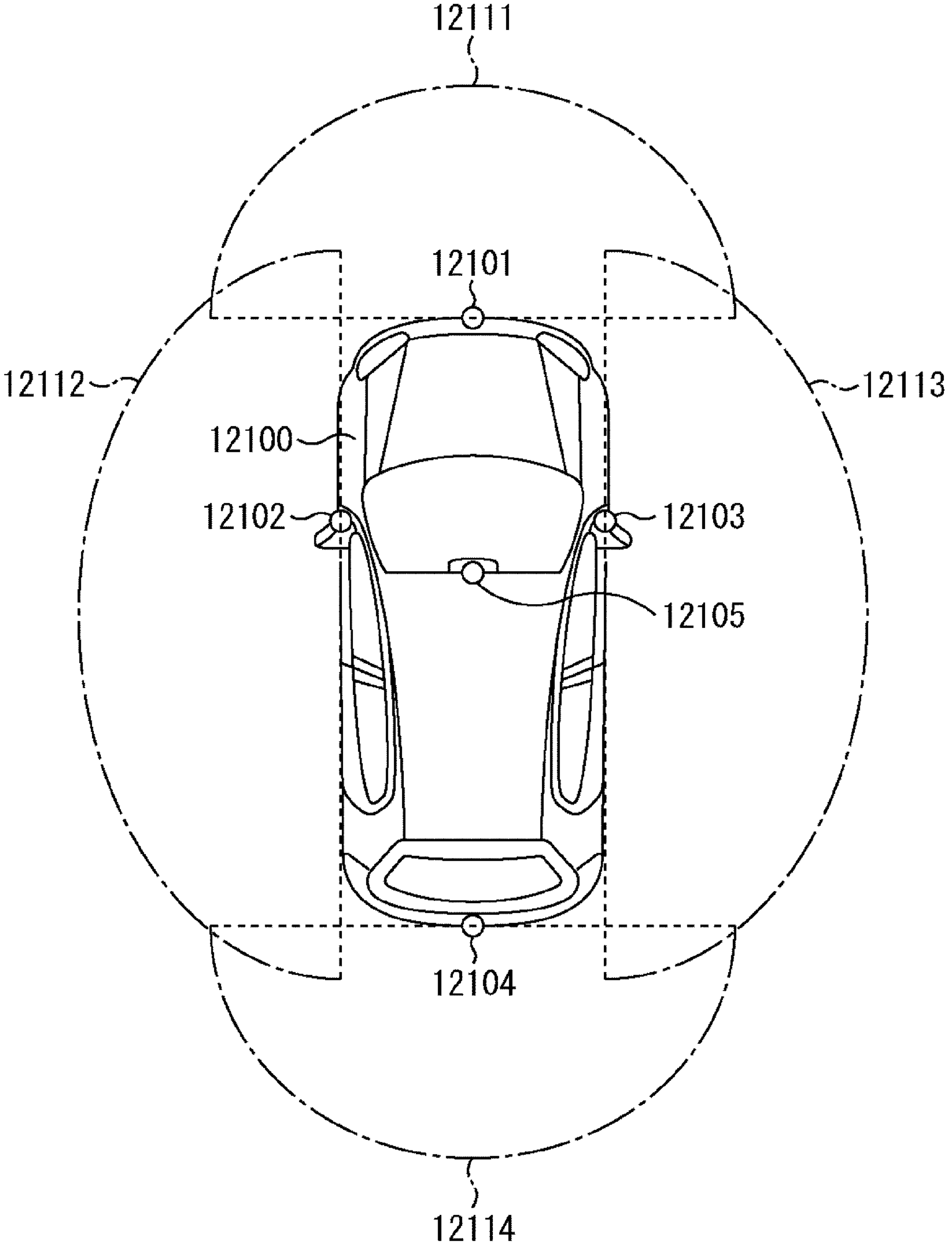
FIG. 19 is a diagram of assistance in explaining an example of installation positions of an outside-vehicle information detecting section and an imaging section.

FIG. 19 is a diagram depicting an example of the installation position of the imaging section 12031.

In FIG. 19, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 19 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure is applicable has been described above. The technology according to the present disclosure is applicable to the outside-vehicle information detecting unit 12030 or the in-vehicle information detecting unit 12040 among the above-mentioned configurations. Specifically, through ranging by the ranging system 1 serving as the outside-vehicle information detecting unit 12030 or the in-vehicle information detecting unit 12040, processing of recognizing the driver's gesture can be performed to execute various (for example, audio system, navigation system, or air conditioning system) operations based on the gesture or more accurately detect the driver's conditions. Further, through ranging by the ranging system 1, the irregularities of the road surface can be recognized to be reflected in the control of the suspension.

The embodiment of the present technology is not limited to the embodiment described above, and various modifications can be made within the scope of the gist of the present technology.

The multiple present technologies described herein can be implemented independently of each other as long as no contradiction arises. Needless to say, the multiple present technologies can be implemented in any combination. Further, part or whole of any of the present technologies described above can be implemented in combination with another technology not described above.

Further, for example, the configuration described as a single device (or processing unit) may be divided into multiple devices (or processing units). In contrast, the configurations described above as multiple devices (or processing units) may be put into a single device (or processing unit). In addition, needless to say, a configuration other than the ones described above may be added to the configuration of each device (or each processing unit). Moreover, as long as the configuration and operation of the entire system is substantially unchanged, the configuration of a certain device (or processing unit) may be partially included in the configuration of another device (or another processing unit).

Furthermore, herein, a "system" means an aggregation of multiple components (devices, modules (parts), or the like), and it does not matter whether or not all the components are in the same cabinet. Thus, multiple devices that are accommodated in separate cabinets and that are connected to each other via a network and a single device including multiple modules accommodated in a single cabinet are both "systems."

Note that the effects described herein are merely exemplary and are not limited to them, and effects other than the ones described herein may be provided.

Note that the present technology can also take the following configurations.

(1)

A ranging system including:

a lighting device for irradiating, of multiple divided areas obtained by dividing an entire area where irradiation is allowed, two or more divided areas that correspond to some portions of the entire area with irradiation light; and a ranging sensor for receiving reflected light that is the irradiation light reflected from an object, in which the ranging sensor drives only some portions of an entire light-receiving area that correspond to the two or more divided areas, to receive the reflected light.

(2)

The ranging system according to (1), in which at least two divided areas irradiated with irradiation light by the lighting device are different from each other in light emission intensity.

(3)

The ranging system according to (1) or (2), in which at least two divided areas irradiated with irradiation light by the lighting device are different from each other in modulation frequency.

(4)

The ranging system according to any one of (1) to (3), in which at least two divided areas irradiated with irradiation light by the lighting device are different from each other in light emission period integration time.

(5)

The ranging system according to any one of (1) to (4), in which at least two divided areas irradiated with irradiation light by the lighting device are different from each other in ratio between an on-period and an off-period of a light emission period.

(6)

The ranging system according to any one of (1) to (5), in which two portions of the light-receiving area of the ranging sensor that correspond to two or more divided areas irradiated with irradiation light by the lighting device are different from each other in frame rate.

(7)

The ranging system according to any one of (1) to (6), in which two portions of the light-receiving area of the ranging sensor that correspond to two or more divided areas irradiated with irradiation light by the lighting device are different from each other in exposure period integration time.

(8)

The ranging system according to any one of (1) to (7), in which two portions of the light-receiving area of the ranging sensor that correspond to two or more divided areas irradiated with irradiation light by the lighting device are different from each other in light sensitivity.

(9)

The ranging system according to any one of (1) to (8), in which the ranging sensor includes, in each of one or more pixel columns, an AD conversion section for performing AD conversion of a detection signal that is output from a pixel according to the reflected light.

(10)

The ranging system according to any one of (1) to (8), in which the ranging sensor includes, in each unit of M×N pixels (M and N are integers equal to or larger than 1) arranged in M rows and N columns, an AD conversion section for performing AD conversion of a detection signal that is output from a pixel according to the reflected light.

(11)

The ranging system according to any one of (1) to (10), in which the lighting device includes multiple light-emitting elements, and the multiple light-emitting elements are the same in light distribution characteristic.

(12)

The ranging system according to any one of (1) to (11), in which the lighting device includes multiple light-emitting elements, and the multiple light-emitting elements are different from each other in light distribution characteristic.

(13)

The ranging system according to any one of (1) to (12), further including:

a control section for controlling the two or more divided areas that are irradiated with irradiation light by the lighting device and the some portions of the light-receiving area that correspond to the two or more divided areas.

(14)

The ranging system according to (13), in which the control section decides the two or more divided areas that are to be irradiated and the some portions of the light-receiving area that correspond to the two or more divided areas, on the basis of a light reception result obtained when the lighting device irradiates the entire area with irradiation light and the ranging sensor receives the irradiation light in the entire light-receiving area.

(15)

The ranging system according to (14), in which the control section decides an area of interest on the basis of a light reception result obtained when the lighting device irradiates the entire area with irradiation light and the ranging sensor receives the irradiation light in the entire light-receiving area, to thereby decide the two or more divided areas and the some portions of the light-receiving area that correspond to the area of interest.

(16)

The ranging system according to (15), in which the area of interest includes any of a face region of a person, a body region of the person, a region in which a moving object is present, a gaze region of the person, a saliency region, or a user specified region.

(17)

The ranging system according to any one of (14) to (16), in which the control section decides the two or more divided areas that are to be illuminated and the some portions of the light-receiving area that correspond to the two or more divided areas, on the basis of a depth map and a confidence map obtained when the lighting device irradiates the entire area with irradiation light and the ranging sensor receives the irradiation light in the entire light-receiving area.

(18)

A drive method for a ranging system including a lighting device and a ranging sensor, the drive method including:

irradiating, by the lighting device, of multiple divided areas obtained by dividing an entire area where irradiation is allowed, two or more divided areas that correspond to some portions of the entire area with irradiation light; and driving, by the ranging sensor, only some portions of an entire light-receiving area that correspond to the two or more divided areas, to receive reflected light that is the irradiation light reflected from an object.

(19)

An electronic device including:

a ranging system including a lighting device for irradiating, of multiple divided areas obtained by dividing an entire area where irradiation is allowed, two or more divided areas that correspond to some portions of the entire area with irradiation light, and a ranging sensor for receiving reflected light that is the irradiation light reflected from an object, the ranging sensor being configured to drive only some portions of an entire light-receiving area that correspond to the two or more divided areas, to receive the reflected light.

REFERENCE SIGNS LIST

1: Ranging system
11: Lighting device
12: Light emission control section
13: Ranging sensor
14: Signal processing section
64: AD conversion section
71: Pixel
165: Light-emitting element
601: Smartphone

The invention claimed is:

1. A ranging system, comprising:

a lighting device configured to irradiate an irradiation area with irradiation light;

a control section configured to control the lighting device to irradiate at least two divided areas of multiple divided areas of the irradiation area with the irradiation light, wherein the multiple divided areas are based on division of the irradiation area, and the at least two divided areas are smaller than the irradiation area; and a ranging sensor configured to receive reflected light, wherein the reflected light is the irradiation light reflected from an object, the ranging sensor includes:

a pixel array section that includes a plurality of unit pixels, wherein each unit pixel of the plurality of unit pixels comprises M×N pixels, each of M and N is an integer that is equal to or larger than 1, the M×N pixels comprises M rows and N columns, and a pixel of a unit pixel of the plurality of unit pixels is configured to output a detection signal based on the reflected light;

a light-receiving area configured to receive the reflected light, wherein the light-receiving area corresponds to the at least two divided areas, and the light-receiving area comprises at least two unit pixels of the plurality of unit pixels; and a plurality of analog to digital (AD) conversion sections connected to the plurality of unit pixels, wherein each AD conversion section of the plurality of AD conversion sections is connected to one unit pixel of the plurality of units pixels, and an AD conversion section, of the plurality of AD conversion sections, connected to the unit pixel is configured to execute AD conversion of the detection signal, the control section is further configured to:

select the at least two unit pixels of the light-receiving area; and drive only AD conversion sections, of the plurality of AD conversion sections, corresponding to the selected at least two unit pixels of the plurality of unit pixels, and the selected at least two unit pixels of the plurality of unit pixels of the light-receiving area are configured to receive the reflected light.

2. The ranging system according to claim 1, wherein a first light emission intensity of the irradiation light corresponding to a first divided area of the at least two divided areas is different from a second light emission intensity of the irradiation light corresponding to a second divided area of the at least two divided areas.

3. The ranging system according to claim 1, wherein a first modulation frequency of the irradiation light corresponding to a first divided area of the at least two divided areas is different from a second modulation frequency of the irradiation light corresponding to a second divided area of the at least two divided areas.

4. The ranging system according to claim 1, wherein a first light emission period integration time of the irradiation light corresponding to a first divided area of the at least two divided areas is different from a second light emission period integration time of the irradiation light corresponding to a second divided area of the at least two divided areas.

5. The ranging system according to claim 1, wherein a first duty ratio of the irradiation light corresponding to a first divided area of the at least two divided areas is different from a second duty ratio of the irradiation light corresponding to a second divided area of the at least two divided areas, and each of the first duty ratio and the second duty ratio is a ratio between an on-period of a light emission period of the irradiation light and an off-period of the light emission period.

6. The ranging system according to claim 1, wherein a frame rate of a first unit pixel of the at least two unit pixels of the light-receiving area of the ranging sensor is different from a frame rate of a second unit pixel of the at least two unit pixels of the light-receiving area of the ranging sensor, the first unit pixel of the at least two unit pixels of the light-receiving area of the ranging sensor corresponds to a first divided area of the at least two divided areas, and the second unit pixel of the at least two unit pixels of the light-receiving area of the ranging sensor corresponds to a second divided area of the at least two divided areas.

7. The ranging system according to claim 1, wherein an exposure period integration time of a first unit pixel of the at least two unit pixels of the light-receiving area of the ranging sensor is different from an exposure period integration time of a second unit pixel of the at least two unit pixels of the light-receiving area of the ranging sensor, the first unit pixel of the at least two unit pixels of the light-receiving area of the ranging sensor corresponds to a first divided area of the at least two divided areas, and the second unit pixel of the at least two unit pixels of the light-receiving area of the ranging sensor corresponds to a second divided area of the at least two divided areas.

8. The ranging system according to claim 1, wherein a light sensitivity of a first unit pixel of the at least two unit pixels of the light-receiving area of the ranging sensor is different from a light sensitivity of a second unit pixel of the at least two unit pixels of the light-receiving area of the ranging sensor, the first unit pixel of the at least two unit pixels of the light-receiving area of the ranging sensor corresponds to a first divided area of the at least two divided areas, and the second unit pixel of the at least two unit pixels of the light-receiving area of the ranging sensor corresponds to a second divided area of the at least two divided areas.

9. The ranging system according to claim 1, wherein the lighting device includes multiple light-emitting elements, and each of the multiple light-emitting elements is same in light distribution characteristic.

10. The ranging system according to claim 1, wherein the lighting device includes multiple light-emitting elements, and each of the multiple light-emitting elements is different in light distribution characteristic.

11. The ranging system according to claim 1, wherein the lighting device is further configured to irradiate each portion of the irradiation area with the irradiation light, the ranging sensor is further configured to receive the reflected light in the at least two unit pixels of the light-receiving area of the ranging sensor, the ranging system further comprises a signal processing section configured to generate a light reception result based on the irradiation of the each portion of the irradiation area and the reception of the reflected light in the at least two unit pixels of the light-receiving area of the ranging sensor, and the control section is further configured to select the at least two unit pixels of the light-receiving area, based on the light reception result.

12. The ranging system according to claim 11, wherein the control section is further configured to:

determine an area of interest based on the light reception result; and select the at least two unit pixels of the light-receiving area based on the determined area of interest.

13. The ranging system according to claim 12, wherein the area of interest includes at least one of a face region of a person, a body region of the person, a region in which a moving object is present, a gaze region of the person, a saliency region, or a user specified region.

14. The ranging system according to claim 11, wherein the light reception result includes a depth map and a confidence map, and the control section is further configured to select the at least two unit pixels of the light-receiving area, based on the depth map and the confidence map.

15. A drive method for a ranging system, the drive method comprising:

irradiating, by a lighting device of the ranging system, an irradiation area with irradiation light;

controlling, by a control section of the ranging system, the lighting device to irradiate at least two divided areas of multiple divided areas of the irradiation area with the irradiation light, wherein the multiple divided areas are based on division of the irradiation area, and the at least two divided areas are smaller than the irradiation area;

receiving, by a ranging sensor, reflected light, wherein the reflected light is the irradiation light reflected from an object, and the ranging sensor includes:

a pixel array section that includes a plurality of unit pixels, wherein each unit pixel of the plurality of unit pixels comprises M×N pixels, each of M and N is an integer that is equal to or larger than 1, the M×N pixels comprises M rows and N columns, and a pixel of a unit pixel of the plurality of unit pixels is configured to output a detection signal based on the reflected light;

a light-receiving area configured to receive the reflected light, wherein the light-receiving area corresponds to the at least two divided areas, and the light-receiving area comprises at least two unit pixels of the plurality of unit pixels; and a plurality of analog to digital (AD) conversion sections connected to the plurality of unit pixels, wherein each AD conversion section of the plurality of AD conversion sections is connected to one unit pixel of the plurality of units pixels, and an AD conversion section, of the plurality of AD conversion sections, connected to the unit pixel is configured to execute AD conversion of the detection signal;

selecting, by the control section, the at least two unit pixels of the light-receiving area; and driving, by the control section, only AD conversion sections, of the plurality of AD conversion sections, corresponding to the selected at least two unit pixels of the plurality of unit pixels.

16. An electronic device, comprising a ranging system including:

a lighting device configured to irradiate an irradiation area with irradiation light;

a control section configured to control the lighting device to irradiate at least two divided areas of multiple divided areas of the irradiation area with the irradiation light, wherein the multiple divided areas are based on division of the irradiation area, and the at least two divided areas are smaller than the irradiation area; and a ranging sensor configured to receive reflected light, wherein the reflected light is the irradiation light reflected from an object, the ranging sensor includes:

a pixel array section that includes a plurality of unit pixels, wherein each unit pixel of the plurality of unit pixels comprises M×N pixels, each of M and N is an integer that is equal to or larger than 1, the M×N pixels comprises M rows and N columns, and a pixel of a unit pixel of the plurality of unit pixels is configured to output a detection signal based on the reflected light;

a light-receiving area configured to receive the reflected light, wherein the light-receiving area corresponds to the at least two divided areas, and the light-receiving area comprises at least two unit pixels of the plurality of unit pixels; and a plurality of analog to digital (AD) conversion sections connected to the plurality of unit pixels, wherein each AD conversion section of the plurality of AD conversion sections is connected to one unit pixel of the plurality of units pixels, and an AD conversion section, of the plurality of AD conversion sections, connected to the unit pixel is configured to execute AD conversion of the detection signal, the control section is further configured to:

select the at least two unit pixels of the light-receiving area; and drive only AD conversion sections, of the plurality of AD conversion sections, corresponding to the selected at least two unit pixels of the plurality of unit pixels, and the selected at least two unit pixels of the plurality of unit pixels of the light-receiving area are configured to receive the reflected light.

17. The ranging system according to claim 8, wherein each of the plurality of unit pixels includes a charge accumulation section, and the charge accumulation section includes a plurality of floating diffusion layers connected in parallel through a switching transistor.

* * * * *